United States Patent [19]
Metz et al.

[11] Patent Number: 5,768,539
[45] Date of Patent: Jun. 16, 1998

[54] DOWNLOADING APPLICATIONS SOFTWARE THROUGH A BROADCAST CHANNEL

[75] Inventors: Erik Christopher Metz, Bowie; Paul Andrew Zimmerman, Jr., Silver Spring; Laszlo Erdely, Jr., Crofton; Colin Joseph deSa, Burtonsville; Henry G. Hudson, Jr., Annapolis, all of Md.; John W. Darr, Jr., Great Falls, Va.

[73] Assignee: Bell Atlantic Network Services, Inc., Arlington, Va.

[21] Appl. No.: 767,777

[22] Filed: Dec. 17, 1996

Related U.S. Application Data

[63] Continuation-in-part of Ser. No. 498,265, Jul. 3, 1995, Pat. No. 5,666,293, which is a continuation-in-part of Ser. No. 380,755, Jan. 31, 1995, and Ser. No. 250,791, May 27, 1994, Pat. No. 5,635,979.

[51] Int. Cl.$^6$ .................................................. H04H 1/00
[52] U.S. Cl. ..................... 395/200.79; 348/7; 348/10; 348/12; 348/13; 348/385; 455/4.1; 455/5.1
[58] Field of Search ..................... 395/200.79, 828; 348/7, 10, 12, 13, 385; 370/270, 464; 455/4.1, 5.1, 6.1; 379/90.01, 102.03

[56] References Cited

U.S. PATENT DOCUMENTS

| | | |
|---|---|---|
| Re. 34,611 | 5/1994 | Fenwick et al. . |
| 4,506,387 | 3/1985 | Walter . |
| 4,527,194 | 7/1985 | Sirazi . |
| 4,623,920 | 11/1986 | Dufresne et al. . |
| 4,677,685 | 6/1987 | Kurisu . |
| 4,700,386 | 10/1987 | Kohn . |
| 4,706,121 | 11/1987 | Young . |
| 4,709,418 | 11/1987 | Fox et al. . |
| 4,712,239 | 12/1987 | Frezza et al. . |
| 4,816,905 | 3/1989 | Tweedy et al. . |

(List continued on next page.)

FOREIGN PATENT DOCUMENTS

| | | |
|---|---|---|
| 3149992 | 6/1991 | Japan . |
| 1-288421 | 9/1991 | Japan . |
| 94/23537 | 10/1994 | WIPO . |

OTHER PUBLICATIONS

Gelman et al., "A Store–and–Forward Architecture for Video–on–Demand Service, " International Conference on Communications, Denver, Jun. 23, 1991; Communications: Rising to the Heights; Vol. 2 of 3, pp. 842–846.

Hambley, Allan R., "Comparison of Digital and Analog Communication Systems," pp. 8–10, 1990.

*Primary Examiner*—Emanuel Todd Voeltz
*Assistant Examiner*—Patrick Assouad
*Attorney, Agent, or Firm*—McDermott, Will & Emery

[57] ABSTRACT

Set-top terminals utilized in broadband broadcast networks are becoming increasingly intelligent (programmable). However, transmitting executable code, data and interactive audio/video materials through a selectively dedicated link requires an extensive, broadband point-to-point broadband network, which is prohibitively expensive to implement for large numbers of customers. The present invention provides for downloading application software and transmitting audio/video information through one channel of a digital broadcast network. The network also provides two-way, low-speed data communications capacity, e.g. for signaling and/or interactive text services. Signaling via data communication with a text server controls downloading of executable code from the digital broadcast channel into a programmable digital set-top terminal. Execution of the downloaded code in turn controls selective capture and presentation of audio and video segments received over one of the digital broadcast channels. Resident operating system and application software in the terminal provides all communication with nodes of the network. The downloaded code forms a non-resident application having a set of predetermined function calls for activating communication functions of the resident software.

32 Claims, 9 Drawing Sheets

U.S. PATENT DOCUMENTS

| | | |
|---|---|---|
| 4,829,372 | 5/1989 | McCalley et al. . |
| 4,894,714 | 1/1990 | Christis . |
| 4,912,552 | 3/1990 | Allison, III et al. . |
| 4,920,432 | 4/1990 | Eggers et al. . |
| 4,947,244 | 8/1990 | Fenwick et al. . |
| 4,949,187 | 8/1990 | Cohen . |
| 4,963,995 | 10/1990 | Lang . |
| 4,982,430 | 1/1991 | Frezza et al. . |
| 5,003,591 | 3/1991 | Kauffman et al. . |
| 5,010,499 | 4/1991 | Yee . |
| 5,014,125 | 5/1991 | Pocock et al. . |
| 5,027,400 | 6/1991 | Baji et al. . |
| 5,051,822 | 9/1991 | Rhoades . |
| 5,057,932 | 10/1991 | Lang . |
| 5,058,160 | 10/1991 | Banker et al. . |
| 5,105,268 | 4/1992 | Yamanouchi et al. . |
| 5,119,188 | 6/1992 | McCalley et al. . |
| 5,121,476 | 6/1992 | Yee . |
| 5,130,792 | 7/1992 | Tindell et al. . |
| 5,132,992 | 7/1992 | Yurt et al. . |
| 5,133,079 | 7/1992 | Ballantyne et al. . |
| 5,136,411 | 8/1992 | Paik et al. . |
| 5,140,417 | 8/1992 | Tanaka et al. . |
| 5,142,680 | 8/1992 | Ottman et al. . |
| 5,166,886 | 11/1992 | Molnar et al. . |
| 5,168,353 | 12/1992 | Walker et al. . |
| 5,172,413 | 12/1992 | Bradley et al. . |
| 5,181,017 | 1/1993 | Rhoades . |
| 5,189,673 | 2/1993 | Burton et al. . |
| 5,192,999 | 3/1993 | Graczyk et al. . |
| 5,208,665 | 5/1993 | McCalley et al. . |
| 5,223,924 | 6/1993 | Strubbe . |
| 5,231,494 | 7/1993 | Wachob . |
| 5,239,540 | 8/1993 | Rovira et al. . |
| 5,247,347 | 9/1993 | Litteral et al. . |
| 5,247,364 | 9/1993 | Banker et al. . |
| 5,249,044 | 9/1993 | Von Kohorn . |
| 5,253,275 | 10/1993 | Yurt et al. . |
| 5,282,028 | 1/1994 | Johnson et al. . |
| 5,315,392 | 5/1994 | Ishikawa et al. . |
| 5,317,391 | 5/1994 | Banker et al. . |
| 5,335,277 | 8/1994 | Harvey et al. . |
| 5,341,425 | 8/1994 | Wasilewski et al. . |
| 5,341,474 | 8/1994 | Gelman et al. . |
| 5,361,091 | 11/1994 | Hoarty et al. . |
| 5,373,288 | 12/1994 | Blahut . |
| 5,379,421 | 1/1995 | Palazzi, III et al. . |
| 5,400,401 | 3/1995 | Wasilewski et al. . |
| 5,410,326 | 4/1995 | Goldstein . |
| 5,418,782 | 5/1995 | Wasilewski . |
| 5,421,017 | 5/1995 | Scholz et al. . |
| 5,440,632 | 8/1995 | Bacon et al. . |
| 5,442,389 | 8/1995 | Blahut et al. . |
| 5,448,568 | 9/1995 | Delpuch et al. . |
| 5,452,454 | 9/1995 | Basu .......................... 395/700 |
| 5,477,263 | 12/1995 | O'Callaghan et al. ...................... 348/7 |
| 5,481,542 | 1/1996 | Logston et al. . |
| 5,533,021 | 7/1996 | Branstad et al. ....................... 370/60.1 |
| 5,537,408 | 7/1996 | Branstad et al. ........................... 370/79 |
| 5,539,822 | 7/1996 | Lett . |
| 5,544,161 | 8/1996 | Bigham et al. . |
| 5,548,532 | 8/1996 | Menand et al. . |
| 5,553,311 | 9/1996 | McLaughlin et al. . |
| 5,563,648 | 10/1996 | Menand et al. . |
| 5,600,643 | 2/1997 | Robrock, II ............... 370/399 |
| 5,619,250 | 4/1997 | McClellan et al. ......... 348/10 |
| 5,635,979 | 6/1997 | Kostreski et al. ........... 348/13 |
| 5,640,994 | 6/1997 | Daley ....................... 370/259 |
| 5,664,195 | 9/1997 | Chatterji ................... 395/712 |
| 5,666,293 | 9/1997 | Metz et al. ............... 395/200.5 |
| 5,666,487 | 9/1997 | Goodman et al. ................. 395/200.76 |
| 5,677,905 | 10/1997 | Bigham et al. ........................ 370/94.2 |
| 5,682,325 | 10/1997 | Lightfoot et al. ................... 364/514 C |
| 5,684,799 | 11/1997 | Bigham et al. ........................... 370/397 | ns
DOWNLOADING APPLICATIONS SOFTWARE THROUGH A BROADCAST CHANNEL

CROSS REFERENCE TO RELATED APPLICATION

This application is a Continuation-In-Part of U.S. patent application Ser. No. 08/498,265 filed Jul. 3, 1995, now U.S. Pat. No. 5,666,293, which is a Continuation-in-Part of both U.S. patent application Ser. No. 08/380,755 filed Jan. 31, 1995, and U.S. patent application Ser. No. 08/250,791, filed May 27, 1994, now U.S. Pat. No. 5,635,979, the disclosures of all of which are incorporated herein entirely by reference.

TECHNICAL FIELD

The present invention relates to a programmable set-top terminal, typically comprising a network interface module (NIM) and a digital entertainment terminal (DET), for use in digital video program distribution networks and to systems and methods for dynamically downloading application program software to such a terminal.

BACKGROUND ART

Set top terminal devices commonly in use in existing cable television systems have a number of limitations. First, the devices are limited to processing of analog television signals. Also, cable television terminal devices are generally "dumb" devices having a limited set of functionalities constrained by the hard wired programming of the internal microprocessor controlled device. Essentially all cable television terminal devices respond to a selection input from the subscriber, tune to a selected channel available on the cable television network, decode the video program material if scrambled, and provide output signals compatible with a standard television receiver.

Enhanced cable television terminals provide some additional features, such as graphics overlay capability and two way communication of control signalling to and from headend terminal devices. Although such improved terminals facilitate some enhanced services, such as home shopping and purchasing, the performance of these cable television set-top terminals is still limited to analog decoding. Also the range of services is still limited by the hard wired capabilities of the microprocessor within the set-top terminal devices.

Proposals have been made to download computer executable code over cable television networks. In particular, U.S. Pat. Nos. 5,051,822 and 5,181,107 both to Rhoades disclose a terminal device connectable to a cable television network and a telephone line. A subscriber requests a video game or other software stored in a remotely located software storage center by operating the terminal to establish a bi-directional telephone link with the remote storage center. The center transmits the encoded software program together with the terminal identification code as a digital bit stream over a television broadcast channel. The terminal requesting the software monitors all digital bit streams on the broadcast channel but receives only the software program addressed to it, i.e. only after identification code validation occurs. Once reception of all the software data is complete, the terminal acknowledges receipt to the remote storage center and drops the telephone line. The encoded software program is decoded, and the terminal provides a display informing the subscriber that the game or other program is ready for use. The terminal also offers the subscriber the means to interact with the software, e.g. play the game, using contemporary gaming control or input devices. While the Rhoades terminal structure does provide enhanced capabilities, such as video games and home shopping, the display functionality controlled by the downloaded software is limited to computer displays generated in response to the software, there is no direct interaction of the received software with any video program carried on the cable network. The downloaded software does not control further interactions with the storage center. Also, the video transmissions on the cable system are analog, and a separate telephone connection is required for selection inputs to the central storage facility. Furthermore, the terminal device apparently can receive software from the storage center of only one service provider.

Some prior art systems do permit downloading into the cable television decoder itself, however, at least initially, this downloading of information into the decoder was limited to information controlling the decoding of the television program signals, e.g. a key word used in a descrambling algorithm. Dufresne et al., in U.S. Pat. No. 4,623,920 teach a specific scheme for addressing data transmissions over a cable television network to groups of terminals or to individual terminals. The addressed data sent from the head end can include an option table of signals for controlling descrambling of available television programs, data to enable operation of a cable TV converter, or software for operating a peripheral microcomputer separate from the cable television terminal device. The Dufresne et al. terminal is limited to reception of data from only one service provider, i.e. the provider operating the cable TV network. Also, the services provided through the terminal are limited in that the downloaded data apparently does not alter or control the terminal functionality for further interactions with the provider through the network.

Another example of a software downloading system is disclosed in U.S. Pat. No. 5,440,632 to Bacon et al. In this system, the headend of an analog cable television system downloads an 'operating system' to each set-top terminal device. Again, the one service provider operating the headend supplies all downloaded code.

Recently, several different wideband digital distribution networks have been proposed for offering subscribers an array of video services, such as Video On Demand. The following U.S. Pat. Nos. disclose representative examples of such digital video distributions networks: 5,253,275 to Yurt et al., 5,132,992 to Yurt et al., 5,133,079 to Ballantyne et al., 5,130,792 to Tindell et al., 5,057,932 to Lang, 4,963,995 to Lang, 4,949,187 to Cohen, 5,027,400 to Baji et al., and 4,506,387 to Walter. The terminal devices in these digital networks are still limited functionality devices. In these networks, the digital terminal devices still only receive selection inputs, transmit selection signals upstream to the source of the video materials, receive downstream video transmissions, decompress the digitized video materials and convert to analog form, and provide appropriate signals to a television receiver. One example of such a digital video distribution network and the terminal device for such a network, disclosed in Litteral et al. U.S. Pat. No. 5,247,347, will be described in more detail below.

U.S. Pat. No. 5,247,347 to Litteral et al. discloses an enhanced public switched telephone network which also provides a video on demand service to subscribers over the public switched telephone network. A menu of video programming information is displayed at the subscriber's premises by a set-top terminal and a TV set. The subscriber may transmit ordering information via the public switched telephone network to the independent video information providers. Video programming may be accessed and transmitted to the subscriber directly from a video information provider (VIP) or through a video buffer located at a central office (CO) serving the subscriber.

Connectivity between the central office and the subscriber for transmission of video data is provided by an asymmetrical digital subscriber line (ADSL) system. ADSL interface units at the central office multiplex digital video information with voice information to be transmitted to the subscriber and support two-way transmission between the subscriber's line and the X.25 packet data network of one or more control channels. A complimentary ADSL interface unit at the subscriber's premises separates downstream video control signals and voice telephone signals from the line and multiplexes upstream control signals and voice telephone signals onto the line. The ADSL interface on the subscriber premises supplies the broadband digital data stream recovered from the transmission over the subscriber loop to a decoder unit in the set-top terminal. The decoder unit decompresses the audio and video data, and converts the digital audio and video to corresponding analog signals. The decoder can supply baseband analog audio and video signals to a television receiver, or these analog signals can be modulated to a standard television channel frequency for use by the television receiver.

The above detailed discussion of the Litteral et al. system shows that prior art digital distribution networks offer enhanced video services, but the terminal device functionality is still limited to program selection, decoding and display.

A number of suggestions have been made in the press regarding arrays of different services which will become available through broadband digital networks now popularly referred to as the "Information Super Highway". If a different VIP were to offer a different service, the VIP can limit the service to an interactivity with the subscriber essentially corresponding to the functionality available in the terminal device. This approach, however, limits the functional capabilities the new VIP may choose for the different service. Alternatively, the subscriber must buy another terminal device programmed or wired to function in accord with the VIP's new service. This second approach, however, forces the subscriber to purchase and connect up a different terminal device for each different service subscribed to.

From the above discussion it becomes clear that a need exists in the art for set-top terminal devices which process compressed, broadband digital audio/video information and are readily adaptable to perform a variety of related functionalities, as needed to facilitate a range of audio/video and interactive services offered by a large number of information providers.

In commonly assigned application Ser. No. 08/250,791 (and corresponding published PCT application WO/95/33338), it was suggested that software could be downloaded into the digital set-top terminal through a point-to-point connection through a digital broadband network, e.g. similar to that of Litteral et al. As disclosed therein, the software included at least customized applications programs for controlling terminal operation in a manner specified by any one of several information providers. It was also suggested that at least one party would operate a server to download operations system upgrades through a point-to-point connection.

The use of a full broadband channel dedicated to one subscriber for an entire interactive session, as in systems such as that disclosed in the 08/250,791 application (and WO/95/33338), places a heavy burden on network resources. Building a large capacity network to carry a large number of such individual sessions is prohibitively expensive. The alternative, providing a limited number of point-to-point links limits the number of subscribers who can access interactive services at any one time, making the interactive services commercially unattractive to the information providers. The need for level 1 and level 2 gateways further increases the cost and complexity of developing and deploying video dial tone networks having such point-to-point connectivity.

Also, some digital networks under development will have broadcast channels, but at least initially, will not offer point-to-point connections. The disclosure in the 08/250,791 application did not address problems of downloading software to terminals through digital broadcast networks.

In commonly assigned application Ser. No. 08/380,755, it was suggested that software, specifically software related to channel mapping functionalities and navigation through broadcast services, could be downloaded into the digital set-top terminal through a data carousel type cyclical broadcast. Such downloaded software consisted of one or more applications intended for wide general availability. The digital type set-top devices receiving such software were intended as open interface devices to which any provider offering such a download service could download the relevant data and executable code. The downloaded applications, however, provided relatively little interactivity.

Still frame services have been proposed for analog cable television systems to provide a limited capacity interactive service through a single broadcast channel of the CATV network. Some of the prior proposals for such services have utilized digital still frame encoding. However, the digital still frame technology was not compatible with the devices for receiving other signals on the CATV network, i.e. standard analog broadcast television signals. Consequently, a subscriber had to have a digital receiver for decoding the still frame signals separate and in addition to any cable decoder equipment needed to receive the analog channels. These terminals have not been adapted for use in all-digital broadband networks or to provide any associated digital video services. Also, such technologies intended for CATV networks are not readily adaptable to open architecture systems, such as the video dial tone networks disclosed in the above cited applications, for providing information services from multiple providers who operate independently of the network service provider.

Also, the various earlier proposals for software downloading have not adequately addressed issues relating to the interface between the resident software and the downloaded software. In an open video environment, such as a video dial tone network, where several providers offer a variety of software downloads through the network, the network operator must maintain the integrity of the network. In this regard, it is difficult for the network operator to police the downloaded software to insure compatibility with the network functionality. For example, if the downloaded software communicates with control elements of the network, the network operator must insure that the communications conform to accepted network protocol standards and relate only to accepted network operations, for example to avoid engaging a network node in an endless processing loop.

A need therefore still exists to adapt the digital video terminal devices and associated networks to provide interactive services in some manner which utilizes an acceptably low amount of bandwidth and still provides the user with the desirable highly programmable and dynamic interactivity. Also, a need exists for an interface between resident software and downloaded software that protects the network elements and maximizes network integrity.

DISCLOSURE OF THE INVENTION

The present invention addresses the above noted needs by providing methods, systems and terminal device structures for downloading application software and transmitting video information through a digital network. The network utilizes broadcast type digital broadband channels and limited two-way data communications capacity. e.g. for signaling and/or interactive text services. The present invention combines signaling and control via the limited two-way data communications with transport of application program code and limited audio and video segments over one of the digital broadcast channels.

In a first aspect, the present invention relates to a system including a communication network. The network provides a plurality of broadband digital broadcast channels and narrowband two-way data communications. A source of broadcast video programming is coupled to the network. The source transmits broadcast video programming through a first one of the broadcast channels. A software server cyclically transmits software through a second one of the broadcast channels. The software includes at least executable code, and in the preferred embodiments, the software also includes various combinations of data, video and audio.

A text server is coupled to the network for narrowband two-way data communications. Digital terminals coupled to the network selectively receive the broadcast channels. The terminals may also conduct narrowband two-way data communications through the network. e.g. with the text server. Each digital terminal includes a digital audio/video processor selectively processing digital information received via the broadcast channels to produce signals to drive an audio/video output device. A programmable processor controls operation of the terminal, including presentation of information from the first channel and capture and execution of the code from the second channel in response to an instruction from the text server.

Another aspect of the invention relates to the non-resident application formed by the downloaded executable code, the resident software (typically an operating system and a resident application) and the interface and interaction of the non-resident application and the resident software.

Thus, one feature of the invention is that the resident software stored in a protected memory device includes an operating system and resident application for a digital set-top terminal device. In the preferred embodiment, the resident application provides a user interface emulating that of a CATV tuner/decoder, e.g., for channel selections. The operating system and resident application perform all actual communications with the network elements. A random access memory will store any downloaded non-resident application. The resident application provides a software interface for any non-resident application stored in the random access memory. The software interface provides a set of predetermined function calls to facilitate communication with elements of the communication network during selective execution of a non-resident application by the digital set-top terminal.

Another feature of the invention relates to interactive service applications that conform to the software interface. In this aspect, the invention contemplates a storage medium readable by a computer. The medium stores application software for controlling a digital set-top terminal. The application software comprises executable code for controlling operations of a digital set-top terminal in response to user inputs and a plurality of function calls for calling predetermined network communications functions of software resident in the digital set-top terminal. The functions calls include a channel change function call, and a function call for establishment of a two-way low-speed data communication. Examples of the storage medium include the random access memory in the digital set-top terminal and a memory within a software server (e.g. coupled to a communication network for broadcast of the software).

The operating system and resident application conform to the protocols and acceptable functions of the network, and the software interface isolates the network elements from direct communication with the non-resident application. The network operator therefore only needs to require that the interactive service applications carried on the broadcast channel conform to the software interface.

The system, terminal structure and software contemplated by the present invention allow an information provider to offer one or more interactive services utilizing a text server, low-speed two-way data communications and a single broadband digital broadcast channel. To provide video interactivity through the one broadcast channel, the multiplexed transport stream on that channel will contain audio and video information as well as the executable code and related processing data.

Another aspect of the invention relates to a specific method for processing the video transported in this manner. Specifically, a transport stream for an interactive service application comprises first packets containing executable code and second packets containing digital, compressed data for a plurality of sequences of video frames. Each of the first packets includes a first predetermined packet identifier, and each of the second packets includes a second predetermined packet identifier. Some of the second packets include time stamp values. A software server or the like cyclically broadcasts the transport stream on a digital broadband channel. A customer's digital set-top terminal stores the executable code in memory and executes the stored code to control operations thereof. One operation under control of the executable code includes presentation of one of the sequences of video frames. The control of presentation includes capturing packets having the second predetermined packet identifier and within a predetermined range of the time stamp values.

The use of a packet identifier and a time stamp range allows the executable code to specify video and the number of frames in a presentation sequence. The sequence may represent a full-motion video of a predetermined length. Also, in some digital coding schemes, even one fully encoded reference frame will have some loss of resolution when compared to the actual source frame. The use of a plurality of digitally encoded frames representing a single still frame image results in a higher resolution presentation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
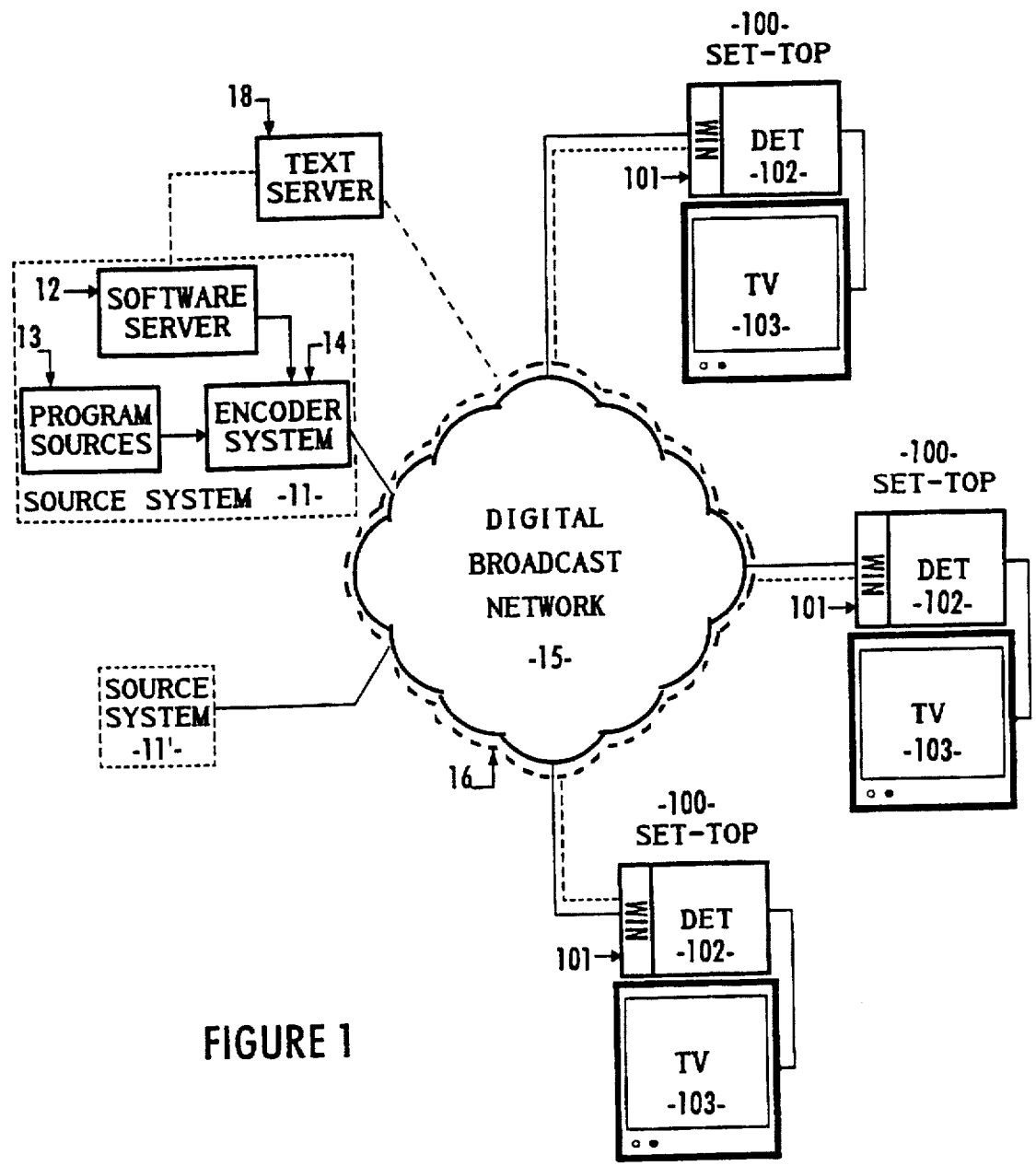
FIG. 1 illustrates a digital broadcast system utilizing the software download technology of the present invention.

In the digital broadband networks of the type under consideration here, each user has a set-top terminal device 100 (FIG. 1). The set-top terminal device 100 includes a digital entertainment terminal (DET) 102 and a network interface module (NIM) 101.

With the present invention the set-top terminal 100 (preferably the DET portion 102 thereof) receives and stores downloaded application software and processes digital video information received through the network. The set-top terminal may also receive operating system software through the network. The network provides broadband channels for digital broadcast services, and two-way narrowband data communications. As discussed more fully below, the present invention relies on a combination of communications through broadcast channels and two-way narrowband data communications to provide an array of enhanced interactive services. As such, the invention does not require the use of broadband point-to-point communications and will provide interactive services through networks that do not have broadband point-to-point capabilities.

If the network supports broadband point-to-point communications, the terminal 100 also could establish a point-to-point link to interactive equipment operated by a video information provider (VIP) and receive interactive applications software through the point-to-point link, as disclosed in the above incorporated 08/250,791 application. The key features of the present invention, however, relate to provision of the interactive services through the broadcast channel and the two-way narrowband data link. The following description therefore concentrates on a presently preferred implementation in a digital network with broadcast channels and two-way narrowband data communications.

FIG. 1 is a high level functional diagram of a network providing digital broadcast services, preferably using ATM cell transport. The preferred embodiment illustrated in FIGS. 8A and 8B and discussed later utilizes end-to-end ATM transport, i.e. with ATM cells for at least the downstream broadband transmissions going all the way to the set-top terminal devices 100. Other networks which may carry the operating system download in accord with the present invention, such as the hybrid-fiber-coax network shown in FIG. 4 of U.S. patent application Ser. No. 08/304,174, utilize ATM transport in a backbone portion of the network only and use some other transport technology for local loop distribution to the subscriber's terminal device. The software downloading techniques of the present invention can be applied to other such digital broadcast networks.

FIG. 1 therefore provides a generic illustration of a broadcast network 15. The network also includes a two-way narrowband data communication network 16, shown in dotted line form. The data network 16 may be a separate parallel network or integrated with the broadcast network 15. The data network 16 may carry signaling information, for example to facilitate channel selection and reception of channels carried through the broadcast network 15. The data network 16 also provides two-way narrowband data communication between the terminals 100 and one or more text servers 18.

The two-way communications through the data network 16 utilize relatively low data rates, when compared to the downstream only transmission through the broadband broadcast network 15. Typically, the communications through the data network 16 utilize data rates in the tens of kilobits per second (e.g. 11, 16 or 64 kbits/s) or low hundreds of kilobits per second. By contrast, the digital broadband broadcast channels of the network 15 provide downstream transport in multiples of megabits per second. In the preferred embodiment, for example, one ATM virtual circuit channel provides 6 Mbits/s of downstream transmission capacity. Six such channels are combined into one DS-3 rate bit stream at approximately 45 Mbits/s.

As shown, the broadcast network 15 receives digitized data streams, preferably in ATM cell format, from one or more sources 11, 11' operated by one or more information providers. In the later discussed preferred embodiment, local loop distribution utilizes switching nodes referred to as host digital terminals (HDT's) which transport ATM cell streams through to the relevant subscribers' set-top terminals 100. In some forms of the network 15, local loop distribution nodes may strip off the ATM cell headers and convert the payload data to some other format for actual transmission to the subscriber terminals. In the preferred embodiment, the local loop distribution network supplies the ATM cells from each broadcast to each set-top terminal 100 from which a subscriber requested the particular broadcast service. The HDTs also provide two-way data transport over the local loop plant to the terminals 100 and provide a data interface to a two-way data network, such as an X.25 network or the like.

Material intended for broadcast through the network is encoded and packetized in accord with a specified protocol or standard, such as DIGICIPHER™. The preferred embodiments utilize MPEG (moving pictures expert group) encoding. Each of the source systems 11, 11' includes one or more program sources 14 and an encoder system 13 for encoding the program material in the desired standard format. Where the network utilizes another transport protocol such as ATM, the encoder also adapts the encoded information to the format utilized on the network 15. In accord with the present invention, the source system 11 also includes a software server which supplies data to the encoder system 14. As discussed more fully below, the data from server 12 includes executable application software or code, short segments of audio and video information and may include individual video frames.

As shown, a number of source systems 11, 11' supply digitized material to the digital network 15 for broadcast.

One service provider may operate a number of the source systems to provide a desired number of broadcast programs or channels. Also, the network may offer a 'video dial tone' type service whereby a plurality of video information providers (VIPs) separately supply their own programming from one or more such broadcast sources 11, 11'. In the simplified example shown in FIG. 1, source system 11 offers a plurality of broadcast programs from sources 13 and broadcasts software for the downloading service. Other source systems such as system 11' may be identical to system 11 and offer both broadcast programming and software downloading, but most of the other systems 11' will offer only broadcast programming. Source systems offering broadcast programs only will be similar in structure and operation to the system 11 discussed below in more detail with regard to FIG. 2, but those systems 11' will not include the software server and the associated element(s) of the encoder system for processing the software.

In normal operation, the broadcast network supplies at least a selected program channel to the set-top terminal 100. The set-top terminal 100 processes digital information from the selected channel to produce signals capable of presenting information from that channel to a user in humanly perceptible form, e.g. to drive a standard television set 103 to display selected video programming. The NIM 101 provides the actual physical connection to the network and the transport protocol processing (e.g. ATM). The DET 102 performs the actual decoding to produce the output signals from the information. The DET 102 also includes the primary intelligent control processor for overall control of the operation of the set-top terminal 100.

The DET portion of the set-top terminal 100 includes a non-volatile random access memory (shown in detail in FIG. 6), for example consisting of electrically erasable programmable read only memory (EEPROM) or flash memory. The non-volatile RAM stores the operating system for the set-top device 100. The operating system defines the basic functionality of the set-top 100. For example, the operating system controls how the microprocessor of the DET 102 interprets application programs. The operating system includes the various driver routines permitting the microprocessor to operate the other elements of the set-top 100. The operating system also includes the basic or 'resident' application under which the DET operates when not running a downloaded application. The resident application preferably emulates a cable television type program reception type user interface for the particular network to which the set-top terminal 100 connects. In accord with one aspect of the invention, discussed more later, the operating system and resident application provide all communications to nodes of the network 15, 16, for example to select broadcast channels and to establish two-way data communications. The resident application provides a specific software interface for downloaded applications such that a downloaded application may 'call' functions of the resident application and operating system.

A party providing the interactive services in accord with the present invention operates a data carousel application. With this type of application, a digital data stream cyclically repeats, and in accord with the present invention, the network carries the repeating data stream on a broadcast channel. The data stream includes video, audio, data and executable code for one or more interactive service applications. The executable code conforms to the software interface provided by the resident application.

In the preferred implementation, the application download and related interactive services will utilize the Micro-Ware DAVID operating system (running on top of OS 9) with the Multimedia Application User Interface (MAUI) graphical environment. The non-resident applications utilize MAUI and adhere to the DAVID specifications.

The download 'image' or file is a concatenation of all of the modules of the image, including modules of OS-9 compatible executable code conforming to the DAVID specifications, data modules, MPEG video modules and MPEG audio modules. The download file is formatted in data storage media command and control (DSMCC) protocol DownloadDataBlocks. A single DownloadDataBlock may contain portions of more that one module.

To provide the broadcast downloading, a VIP operates a software server, such as server 12. Typically, the server 12 is a personal computer or the like which compiles the code and/or data, as well as the audio and video, for transmission. For applications, such as for controlling navigation through the VIP's program services, the computer compiles application software and data to be processed by that application software. For each interactive application, the computer compiles a data file containing the instructions which form the various modules of the executable software and associated data (tables and the like) together with digitally encoded video and audio information into a multiplexed transport stream. The computer cyclically outputs the relevant transport stream data in sequence. For the interactive application example, the computer repeatedly sequentially outputs the contents of the data file for that application.

The server 12 outputs the data file to the encoder system 14. The encoder system processes the data and supplies the processed data to the network 15 for broadcast along with the encoded program information offered by the VIP from the source system 11. When necessary, the set-top interacts with a text server 18 through the data network 16, and in response to the text server communications, the terminal 100 selects the appropriate channel, e.g. logical channel 022, decodes the data from the broadcast through the network on that channel and recaptures all or selected portions of the appropriate application data file. Under some circumstances, the text server 18 may provide instructions to the software server 12 to include requested code, data, audio or video in the broadcast transmission.

In the preferred embodiment, the NIM 101 performs the channel selection and conversion back to a data transport stream (e.g. MPEG packets) from the physical layer protocol utilized on the network (e.g. ATM). The DET 102 in turn processes the transport stream to capture the data file. The DET 102 captures and stores executable code and any related data from the data file. The DET 102 also decodes selected audio and/or video information from the broadcast data file, for use in the interactive presentation to the user.

Depending on the data rate requirements of the interactive application and/or the number of interactive applications provided by the source 11, the channel that carries the interactive application file(s) may also carry a reduced rate video program, such as a program guide. The network offers 6 Mbits/s channels. In one example, the channel might carry one or more applications files at 1.5 Mbits and carry the video and audio packetized elementary streams for the program guide service at a combined rate of 3 or 4.5 Mbits/s in a time division multiplexed transport stream at a combined rate of 6 Mbits/s. Alternatively, the multiplexed data files for one or more interactive applications may utilize the entire 6 Mbits/s transport stream rate for one logical broadcast channel.

The application download operation of the present invention may be initiated in several ways. For example, the user may select a VIP and establish a text session between the set-top terminal 100 and the text server 18 of the VIP of choice. The text server would then provide instructions identifying the broadcast channel carrying the VIP's interactive application software. If the broadcast transport stream carries software for a plurality of applications, the text server 18 also transmits any information needed to capture the correct materials for one selected application. In the preferred embodiment, the user selects a broadcast channel having a related text service. In response the networks 15, 16 provide the broadcast channel to the set-top 100 and establish a two-way low data rate link between the set-top terminal 100 and the text server 18. At any time during the session, the text server 18 sends an instruction to the set-top terminal 100 to initiate the download operation. If a selected application is not on the data carousel in the broadcast channel currently received by the set-top terminal, the text server 18 can instruct the set-top terminal to change to another broadcast channel and receive the application download.

As part of any such download procedure, the DET 102 executes a normal channel selection appropriate to the particular network 15, 16 to receive the channel carrying the software broadcasts. In the present example, the DET 102 instructs the NIM 101 to select channel 022, and the NIM alone or through interaction with network elements selects that broadcast channel, captures the transport stream therefrom and passes that stream to the digital signal processing circuitry within the DET 102. The DET 102 processes selected portions of the transport stream to capture the code and data of an identified application and to decode selected video and audio for interactive presentation to the user.

Figure 2:
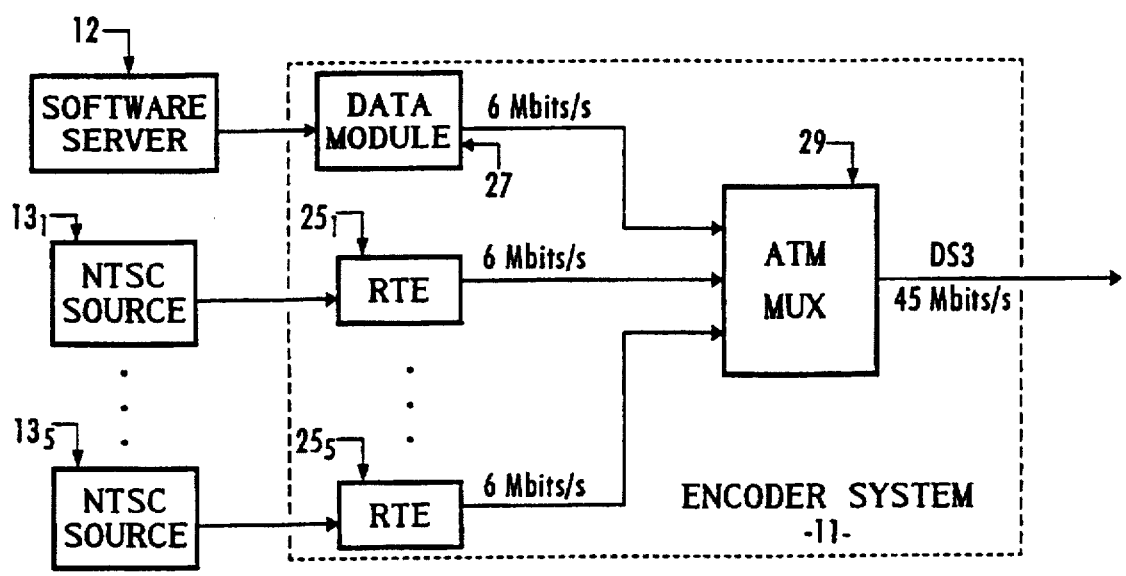
FIG. 2 shows a software server, program sources and an encoder system used in the network of FIG. 1.

FIG. 2 shows the elements of the source system 11 in more detail. In the illustrated preferred embodiment, the source system includes five sources ($13_1$ to $13_5$) of baseband audio/video information, e.g. in NTSC signal format. The encoder system 14 includes a corresponding number of real time encoders (RTEs) $25_1$ to $25_5$. Each RTE converts one baseband program signal into digitized and compressed form in accord with the selected protocol. The RTEs supply encoded information to an ATM multiplexer 29, either directly as shown for live or other real-time type broadcast services or through some form of storage device or server (not shown) for other types of broadcast and IMTV services.

The encoder system 11 also includes a data module 27, such as a data module manufactured by DiviCom, Inc. of Milpitas, Calif. The data module 27 receives the cyclic data output from the software server 12 via an appropriate data interface, e.g. via an Ethernet local area network interface. The protocol on this interface identifies the different types of information passing across the interface, e.g. data, video, audio, etc. The audio and video is already digitized and compressed in a format compatible with the packetization protocol. For example, if the network 15 transports MPEG II packets, the audio and video at this interface may be digitized and compressed in the MPEG I encoding format. The data module 27 formats the payload data received via the interface into the same type of packets as produced by the real time encoders $25_1$ to $25_5$. Preferably, the data module 27 also constructs and inserts certain packets carrying information that the set-tops 100 need in order to find and decode various applications and copies (if any) of operating systems carried in the packet stream. Because the output from the software server 12 cyclically repeats, the resulting sequence of packets output from the data module 27 also repeats. In an alternate embodiment (not shown), the server and data module could be combined, so that the interactive application software (code, data, audio and video) is stored in memory in MPEG II packet form and cyclically, repeatedly output. DiviCom also manufactures a spooling device for this purpose identified as a DME-100.

The data module 27 supplies the packets to another input of the ATM mux 29. The ATM mux adapts the packets from module 27 into ATM cells in the same manner as for packets from the real time encoders $25_1$ to $25_5$ and multiplexes the resultant cells into the output stream together with the cells carrying the encoded program information. In the illustrated embodiment, it was assumed for simplicity that the data module 27 operated at rates at least up to 6 Mbits/s, therefore a single data module would process all of the carousel material for one 6 Mbits/s broadcast channel in the preferred network architecture. If the available data module 27 operates at a lower data rate, e.g. 2 or 3 Mbits/s, and the channel capacity (6 Mbits/s in the preferred embodiment) is higher than the throughput rate of the data module, the encoder system 11 can use two or more data modules. In such an alternate implementation, the ATM mux 29 would combine the output streams from the data modules 27 into one ATM virtual circuit at approximately the higher rate (e.g. 6 Mbits/s).

In the preferred embodiments, the program material represents a television type program or the like in NTSC format. The video information, accompanying audio information and certain related data are encoded using a standardized digitization and compression technique, such as DIGICIPHER™ or preferably MPEG (moving pictures expert group). Typically, these digital compression protocols also specify a standard packet data format. One such protocol is used for the normal broadcast programming and for the interactive applications. In accord with another aspect of the invention, the encoding and packetization protocol is manipulated to provide certain limited video and audio capabilities on interactive services, without requiring long-term full usage of a broadband channel. It is therefore useful to consider the preferred protocol in somewhat more detail.

In the preferred implementation, the RTEs $25_1$ to $25_6$ and the data module 27 operate in accord with MPEG II. A detailed discussion of the standard may be found in International Organisation for Standardization Organisation Internationale de Normalisation, "Coding of Moving Pictures and Associated Audio", ISO/IEC JTC/SC29/WG11, CD ISO/IEC 1-13818, February 1994, and a brief summary of MPEG II processing follows. The data carousel output by the data module 27 preferably conforms to the related Download Standard (ISO/IEC DIS 13818-6).

The MPEG standard specifies a bi-directional predictive coding compression system, utilizing discrete cosine transformation (DCT) processing, motion-compensated predictive coding, adaptive quantization and variable length coding to digitize and compress video information. For video information, the encoder will develop reference (I) frames, forward predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference (I) frame, this specific number also is set in the MPEG syntax. Information from previous video frames as well as later video frames is used in formulating the prediction. "Delta" or "B frame information is developed for coding the video frames between the actual and predicted frames, also by looking at frames in both directions. Rather than updating a whole frame, only the changed (or delta) information is provided for the delta video frames. Typically, between I frames, the frame sequence consists of a repetitive succession of two B frames followed by one P frame.

More specifically, a two dimensional discrete cosine transform is applied to macroblocks to encode an I-frame. The macroblocks may consist of an 8×8 or a 16×16 matrix of pixels. The data regarding each encoded macroblock comprises four blocks containing the luminance signal information for the macroblock and two blocks containing chrominance signal information for the macroblock. The data stream representing the I-frame is quantized, using adaptive quantization, and the quantized data is encoded using a diagonal-scan, run-length code for each macroblock. Each macroblock of I-frame information includes data specifying the quantization level, a macroblock address, a macroblock type identifying the data as I-frame (intra-frame) encoded data, the actual DCT coefficients and an end of block code.

Within a group of frames, the I and P frames are designated as anchor frames. The P frames are predictively encoded with respect to the preceding anchor frame (I or P). B-frames are encoded with respect to preceding anchor frames (I or P) and succeeding anchor frames (I or P).

The encoding of P and B frames utilizes interframe predictive encoding to further compress the video data of each frame. For P frames, the discrete cosine transform coefficients for each macroblock are processed to identify a reference macroblock of a prior anchor frame that is the closest match to the macroblock. The macroblock of the P-frame is then encoded as DCT coefficients representing the residue or difference between the macroblock and the reference macroblock and a motion vector specifying the displacement between the location of the reference macroblock in the anchor frame and the location of the macroblock in the P-frame. B-frames are encoded in the same manner as P-frames except that the matching, difference encoding and vector encoding occur with respect to the nearest match in either a preceding anchor frame (I or P) or a succeeding anchor frame (I or P). Any macroblocks in a P or B frame for which there is not an adequate match in a relevant anchor frame are intra-frame encoded using the original coefficients in a manner similar to macroblocks in an I-frame.

The data stream representing either a P-frame or a B-frame is adaptively quantized and encoded using a diagonal-scan, run-length code for each macroblock. The information for each macroblock in these frames includes data specifying the quantization level, a macroblock address, a macroblock type identifying the data as inter-frame or intra-frame encoded data, the actual DCT coefficients and an end of block code. The data also identifies the reference macroblock and the motion vector.

MPEG II also specifies digitizing and compressing techniques for accompanying audio information. The MPEG II standard provides a standardized format for packetizing the compressed audio and video information and for other data. Under the MPEG II standard, incoming individual video signals and related audio signals are encoded and packetized into respective Video and Audio Packetized Elementary Streams (PES). The video and audio PES's from one or more sources of video programming may be combined with similarly packetized data into a transport stream for transmission or storage. The data may relate to the program, for example closed captioning information. The transport stream may also include private 'user' data which is independent of the audio and video information. The data and executable code for the interactive applications are carried as private user data in an MPEG II transport stream. The stream may also carry private user data for operating system downloads.

Each frame of compressed audio or video program information is broken down into a series of transport packets. Although the frames can vary in length, e.g. between a full reference I-frame and a delta B-frame, the transport packets have a fixed 188 byte size. Thus, different frames are broken down into different numbers of MPEG II transport packets. For example, in a 6 Mbits/s encoding system, a group of frames consisting of a total of 15 frames for one-half second of video (one I frame and a number of P and B frames), breaks down into approximately 4000 transport packets. Data, e.g. received in Ethernet protocol form, is also repacketized into MPEG II transport packets.

The MPEG II standard permits transport of private or user data as payload information in the 188 byte packets. As discussed in more detail below, each packet includes a packet identifier (PID) value, and the encoder or data module inserts the assigned PID into the packet as part of the packet formatting process. Different PID values are assigned to different programs and content. For example, one program may have a first PID for video, a second PID for audio and a third PID for related data (e.g. closed captioning). The same stream may also contain private data not directly related to the program, e.g. application or operating system software, and a different PID is assigned to packets transporting that data. In a stream transporting information for a plurality of applications, each application would have a PID for video or picture information, a PID for audio, and one or more PIDs for data (executable code and data to be processed).

Figure 3:
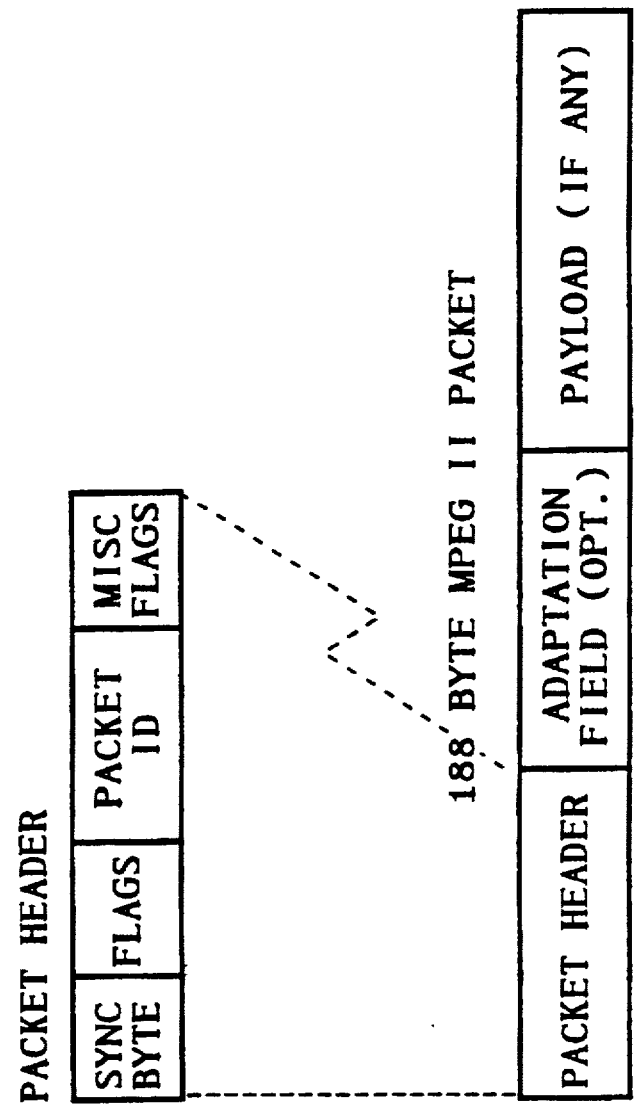
FIG. 3 illustrates an exemplary structure of an MPEG II type data packet.

As shown in FIG. 3, each 188 byte transport stream packet consists of two or three sections, a 4 byte packet header section, a payload section and/or an optional adaptation field. The header information includes, inter alia, a synchronization byte, a variety of different flags used in reconstruction of the frames, and a thirteen bit program identification (PID) number. PID value 0 is reserved as an indication that the packet includes program association table data (mapping program numbers (PNs) for individual programs into PID values for program maps for those programs). PID value 1 is reserved for identification of packets containing conditional access data, such as encryption information. Other program identification numbers are utilized to identify transport packets with the program source from which they originate.

Periodically, the transport packet for each audio/video program will also include a program reference clock (PRC) value within the optional adaptation field. In a typical 6 Mbits/s MPEG II encoding system, the PRC is present in approximately 10 out of every 4000 video transport packets.

When included, the optional adaptation field includes a section for miscellaneous flags, such as discontinuity counter, private data flag, etc. One of the possible flags carried in this portion of the adaptation field is a program clock reference (PCR) flag. The adaptation field (AF) also includes a section designated for AF options. One of the options this section may carry is the PCR value.

On decompression, the decoder in the DET 102 in sequence reconstructs the frames for a particular program from packets bearing the appropriate PID values, uses the reference frame to form the prediction frames, and then uses the prediction frames and delta information to construct full frames from the delta frames. As discussed in more detail below, circuitry within the DET 102 routes the private data, such as the software download data, to the microprocessor of the DET for further processing.

Returning to FIG. 2, the data module 27 receives a data stream, e.g. via Ethernet, from the software server 12 and converts the data stream to an MPEG II transport stream consisting of packets of the type shown in FIG. 3. Essentially, the data module 27 subdivides the input data into units which will fit in the payload of MPEG II packets and combines those units with appropriate MPEG II headers to form the MPEG II packets. For example, the information in the added headers identifies certain packets as containing the executable code and data and identifies the payload information thereof as private user data. The data module 27 therefore inserts one or more appropriate PID values into the packet headers identifying the video, audio and data for each of the interactive applications.

The data module 27 also constructs a number of packets used to find and decode desired sequences of packets in the stream, for example a program association map (PID 0), a program map table for each interactive application carried on the transport stream, and a network table. The information contained in the map and tables are discussed in more detail below.

NTSC encoded video includes SMPTE (Society of Motion Picture Experts) time base information. MPEG encoded video includes the SMPTE time codes. The digitization and compression of NTSC video into MPEG II format also produces a number of additional time stamps that are included in the transport stream, such as the program time stamp (PTS) as well as the program clock reference (PCR) value discussed above. As discussed more fully below, the audio and video presentation of interactive services in accord with the present invention involves decoding segments of audio and video information identified by program identifiers (PIDs) and one of these time base values. In this manner, an interactive application might call for the capture and decoding of a 10 second segment of audio and video information carried in the transport stream, e.g. to provide a short full motion video presentation. Alternatively, the application might call for decoding of 3 to 5 video frames (one I, plus two P and possibly one or two B frames) representing a still frame image.

The preferred network embodiments utilize ATM transport, therefore the encoder system 14 includes an ATM multiplexer (mux) 29. The data module 27 receives a repeating or cyclical sequence of one or more data files from the server 12 and supplies a repeating sequence of MPEG II packets to the ATM multiplexer 29.

In ATM, transfer is asynchronous in the sense that the recurrence of cells that contain information from any particular sender is not necessarily periodic. Each device using an ATM network submits a cell for transfer when the device has a cell to send, not when the device has an assigned or available transmission time slot. However, the ATM cells may ride in synchronous slots on a high-speed time division multiplexed media, such as a SONET optical fiber. ATM allows any arbitrary information transfer rate up to the maximum supported by the ATM network, simply by transmitting cells more often as more bandwidth is needed.

In ATM, information is organized into cells having a fixed length and format. Each cell includes a header, primarily for identifying cells relating to the same virtual connection, and an information field or "payload". Under presently existing ATM standards, a 53 byte ATM cell includes a cell header consisting of 5 bytes and a payload consisting of 48 bytes of payload data (see FIG. 4). The ATM cell header information includes a virtual path identifier (VPI) and a virtual circuit identifier (VCI) to identify the particular communication to which each cell relates. The specific format of the ATM cell is described, for example, in the ATM User Network Interface Specification, Version 3.0, published by The ATM Forum, Mountain View, Calif., also published by Prentice Hall, the disclosure of which is incorporated in its entirety by reference.

Figure 4:
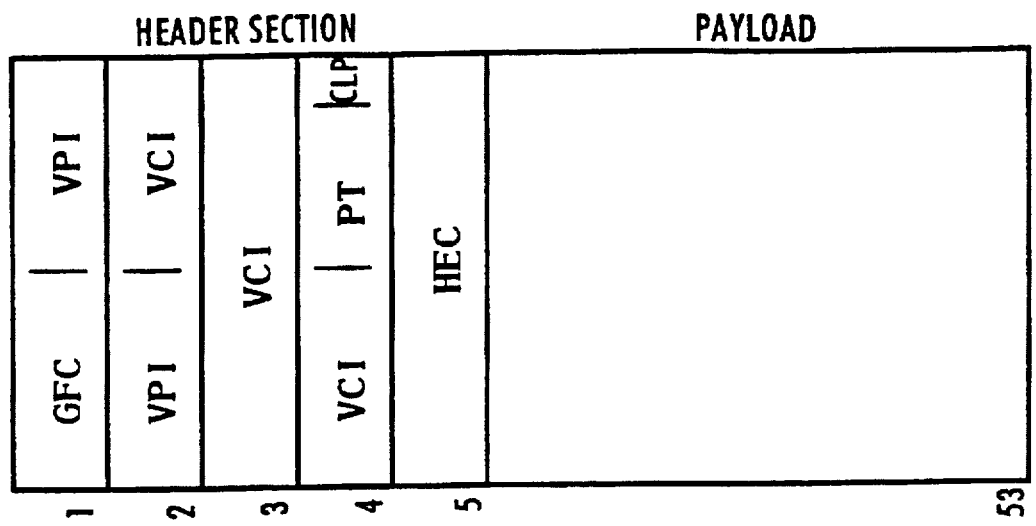
FIG. 4 shows an exemplary structure of an ATM cell.

FIG. 4 depicts a typical ATM cell format. The ATM cell includes a header section and a payload section. The first 8-bit byte of the header section includes a 4-bit GFC word which provides access control. The first byte of the header section also includes the lower four bits of an 8-bit virtual-path identifier (VPI). The second byte of the header section includes the upper four bits of the VPI and the first four bits of a 16-bit virtual circuit identifier (VCI). The third byte includes the next eight bits of the VCI. The fourth byte of the header section includes the last four bits of the VCI; a 3-bit payload type indicator (PT); and a cell loss priority bit (CLP). The fifth byte of the header section includes an 8-bit header error check (HEC) word. Bytes 6 to 53 carry information and form the ATM cell payload section.

As used here, the ATM multiplexer 29 performs an ATM adaptation function which converts the input information (in MPEG II transport packets) into ATM cells. The ATM multiplexer 29 also performs a multiplexing function to combine cells streams carrying payload data from a number of sources into one higher rate bit stream.

In ATM based networks of the type under consideration here, the MPEG II bit streams are converted into cellular payload data, and cell headers are added. A number of techniques can be used to adapt the transport packets into ATM cells, and certain preferred techniques are described below by way of example.

Figure 5A:
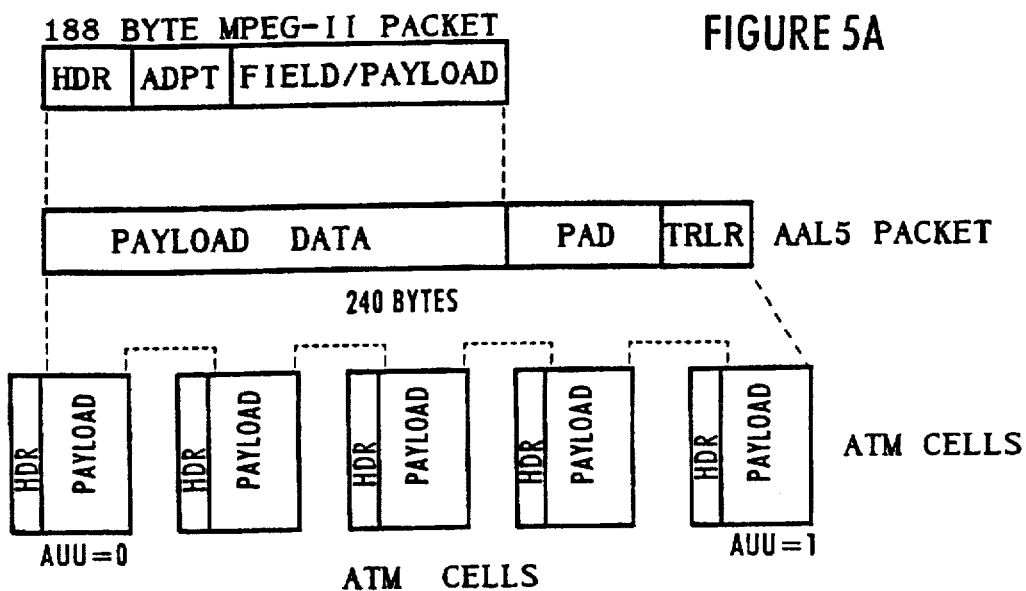
FIG. 5A illustrates a five-cell adaptation for mapping an MPEG II packet into ATM cells.
Figure 5B:
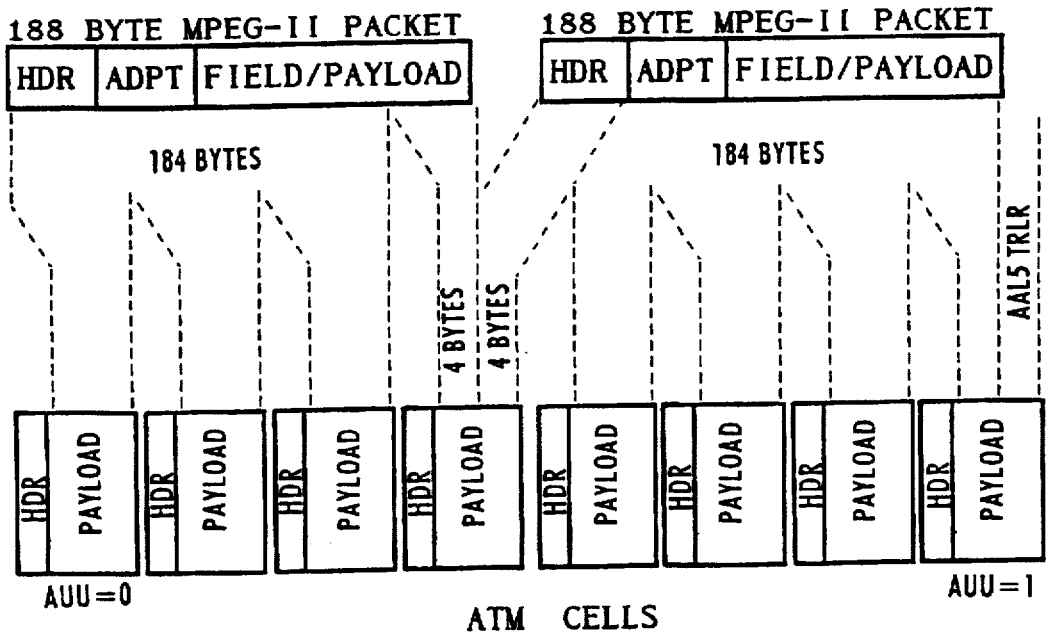
FIG. 5B illustrates an eight-cell adaptation for mapping two MPEG II packets into ATM cells.

As noted above, each MPEG packet consists of 188 bytes, whereas each ATM cell includes 48 bytes of payload data. The ATM multiplexer 29 which maps the MPEG II packets into ATM cells preferably uses two different adaptations to encapsulate MPEG II packets in ATM cells. The first adaptation maps one 188 byte MPEG packet into five ATM 48 byte cell payloads (FIG. 5A). The second adaptation maps two 188 byte MPEG packets into eight ATM 48 byte cells payloads (FIG. 5B).

MPEG packets of 188 bytes map efficiently into ATM cells if pairs of packets are mapped into 8 cells. However, a delay is imposed on mapping of a first cell while waiting for the second cell in the pair. To minimize jitter at the decoder, the packets carrying the PCR values need to be encoded and transported quickly. To avoid delaying first packets containing a PCR while processing a second packet, the present system maps first packets containing a PCR immediately, using the five cell adaptation procedure. In a typical video transmission, the PCR is present in approximately 10 out of every 4000 MPEG II packets. Also, at least some of those 10 packets will arrive as the second packet of a pair. Consequently, only a very small number of packets are mapped using the less efficient 5-cell adaptation.

As shown in the simplified block diagram of FIG. 2, each MPEG type real time encoder RTE 25 supplies a stream of MPEG II packets to the ATM multiplexer 29. The ATM multiplexer 29 checks the flags in the adaption field (if any) in the first packet to determine if that packet includes a program clock reference (PCR) value. The ATM multiplexer applies the 5 cell adaptation to first packets containing a program clock reference (PCR) value. The ATM multiplexer applies the 8 cell adaptation to pairs of cells wherein the first packet does not contain a program clock reference (PCR) value. Packets containing private data, such as applications, code and data, or operating system software, will not contain a PCR flag.

For each type of adaptation, the ATM multiplexer 53 will first convert the source packet or pair of packets into a single ATM adaptation layer 5 (AAL5) packet. As part of this conversion, the mux will add an AAL5 trailer, either at the end of the single packet or at the end of the pair of packets. The actual trailer consists of 8 bytes of data, including 4 bytes of cyclic redundancy check (CRC) data, user information (e.g. length), etc.

For a 5 cell adaptation (FIG. 5A), the AAL5 packet consists of a single MPEG packet of 188 bytes and an 8 byte AAL5 trailer, for a total of 196 bytes. To map this packet into ATM cells, the AAL5 packet is also padded with 44 bytes after the trailer, for a total of 240 bytes of payload data. The ATM mux 53 breaks the AAL5 packet (240 bytes) down into five 48-byte payloads (SAR-PDU) and attaches appropriate 5 byte headers to each payload to thereby form five 53-byte ATM cells.

The header of all five of the ATM cells will contain the VPI/VCI value assigned to the particular communication. For example, for the interactive application(s) software downloading, the assigned VPI and VCI value might correspond to network logical channel 022. The video and audio portions of the interactive application(s) include packets which periodically contain a PCR value, and such packets periodically would go through the 5 cell adaptation in the normal manner. The header of the first of the five cells also has a bit designated "AAU" which has a value of "0" to identify that cell as the first cell. The header of the fifth cell will have an AAU bit value of "1" to identify that cell as the last cell.

For an 8 cell adaptation, the AAL5 packet consists of two MPEG packets of 188 bytes and an 8 byte AAL5 trailer, for a total of 384 bytes. The ATM mux 53 breaks the AAL5 packet (384 bytes) down into eight 48-byte payloads and attaches appropriate 5 byte headers to each payload to thereby form eight 53-byte ATM cells. The AAL5 layer is omitted from FIG. 5B for simplicity. That drawing shows the mapping of two MPEG packets into eight ATM cells with the inclusion of the AAL5 trailer in the last cell.

The header of all eight of the ATM cells will contain the VPI/VCI value assigned to the particular communication. Continuing the above example, if the MPEG data relates to the interactive application(s) service, the assigned VPI and VCI values would identify logical network channel 022 as in the above discussed example of the five-cell adaptation. The header of the first of the eight cells will have an AAU bit value of "0" to identify that cell as the first cell. The header of the eighth cell will have an AAU bit value of "1" to identify that cell as the last cell. The executable code and associated data, the audio and most of the video for all applications serviced via the broadcast channel would be subject to such an 8-cell adaptation.

As noted above, each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, in the above broadcast example, the cells from the one broadcast program all contain the same VPI/VCI value whether the five-cell adaptation was used or the eight-cell adaptation was used. The cells for one interactive program service will likewise have one VPI/VCI value.

In the presently preferred embodiment, the ATM mux 29 processes MPEG II packet streams for a combined program or transport stream capacity of approximately 36 Mbits/s. For simplicity, it is assumed that normal video programs utilize a 6 Mbits/s encoding. As noted, the interactive application related broadcast may use less than a full 6 Mbits/s channel. In such an implementation, the ATM mux 29 receives packet streams from up to six real time encoders (RTEs) 25 and one data module 27. In the presently preferred implementation, the interactive application transmission from the data module 27 utilizes the full 6 Mbits/s rate. The encoder system includes five real time encoders $25_1$ to $25_5$. In a source system 11' offering no software downloading service there would be no server 12 or data module 27, and the mux 29 would receive six 6 Mbits/s MPEG II streams from six RTEs.

The ATM mux 29 performs the AAL5 adaptations of FIGS. 5A and 5B on all of the inputs from the real time encoders 25 and the data module 27 (if included). The ATM mux 29 forms the actual ATM cells with assigned VPI/VCI values in the cell headers and combines the ATM cells from all of the programs and the software transmission from data module 27 into a single DS3 rate bit stream. For the source 11, for example, the ATM mux 29 adapts six 6 Mbits/s MPEG II transport streams, from the five real time encoders $25_1$ to $25_5$ and the data module 27, into ATM cells and combines the ATM cell streams together with some overhead information into one 45 Mbits/s DS3 rate stream (one way only).

In mapping cells from multiple programs to ATM cells and combining cell streams into a signal bit stream, it is necessary for the mux 29 to map the PID value from each MPEG II packet into the correct VPI/VCI value for the corresponding program. The ATM mux 29 therefore is programmed to: (1) recognize the PID values of packets for each program and/or the particular input port on the ATM mux 29, (2) apply the adaptation techniques discussed above relative to FIGS. 5A and 5B, and (3) map the PID values into the assigned VPI/VCI values.

At the network node which terminates the ATM cell transport, a receiver captures each ATM cell having a specified VPI/VCI. In the preferred embodiment, the network 15 transports ATM cells through to the set-top terminals 100, therefore the receiving node would be the subscriber's terminal or set-top 100.

The element of the network terminating ATM transport will include an ATM demultiplexer (not shown). In the preferred embodiment utilizing ATM cell transport to the set-top terminal devices 100, the ATM demultiplexer is an element of the NIM 101. In other network implementations, the ATM demultiplexer may simply reconstruct the MPEG transport streams and supply those streams to some other mechanism for broadcasting the MPEG streams to the set-top devices 100.

Wherever implemented, the ATM demultiplexer receives a multiplexed ATM cell stream carrying ATM cells relating to a number of programs or sessions. The ATM demultiplexer performs two functions, (1) demultiplexing the combined stream to recover cells relating to at least one communication and (2) ATM to MPEG reverse adaptation to strip off the ATM cell headers and reconstruct the MPEG packets. In the preferred embodiment wherein the ATM demultiplexer is an element of the NIM 101, as part of the demultiplexing function, the demultiplexer captures all MPEG II packets carried in cells having a single specified VPI/VCI value and provides those packets to a decoder section in the DET 102 for further processing.

Other demultiplexing functions are possible depending on where the demultiplexer fits into the overall network architecture. For example, the demultiplexer could provide multiple outputs to multiple decoders. For example, the hybrid fiber coax based system disclosed in FIG. 4 of the above-cited 08/304,174 application, an ATM packet handler performs the ATM demultiplexer function. That packet handler provides multiple output rails each of which carries a combined MPEG II packet stream for 4 programs for broadcast in one 6 MHz RF channel. The NIM captures a combined stream from an RF channel, and an MPEG decoder in the DET processes packets for one of the 4 programs based on PID value recognition.

As part of the reverse adaptation functionality, the demultiplexer buffers cells until it finds a cell having an AAU value of "0" in its header (first cell) and another cell having an AAU value of "1" in its header (last cell). The demultiplexer counts the number of cells from first to last to determine the type of adaptation used to map cells.

If the demultiplexer has captured five cells, the demultiplexer pulls out the payload data and uses the CRC data do check for errors. If there are no errors, the original MPEG packet is reconstructed from the appropriate bytes of payload data from the first four cells. Similarly, if the demultiplexer has captured eight cells, the demultiplexer pulls out the payload data, does the CRC based error check, and if there are no errors, the original pair of MPEG packets is reconstructed from the appropriate bytes of payload data from the eight cells.

The DET 102 processes the MPEG II packets in the resultant stream based on their respective PID values. Packets having PID values assigned to audio or video are processed by corresponding decoders and associated driver circuits to produce signals for driving the television set 103 to display the program information to the user. Downloaded software, however, is transferred as private data to the microprocessor of the DET. For example, if the software relates to an operating system, the microprocessor executes an upgrade routine to replace the existing operating system stored in non-volatile RAM with the newly received operating system software. Of particular note for purposes of the present invention, if the data relates to a selected interactive application, e.g. executable code and data relating to application processes, the microprocessor stores the data in RAM and begins execution of the application from the data in the RAM.

When a user selects an interactive service, the set-top terminal 100 will initiate a two-way data call through the data network 16 to the text server 18 for the VIP of choice. The text server 18 will execute an authentication routine to determine the identity of the calling terminal 100 and determine whether that terminal currently is authorized access to the interactive services offered by the source 11. The text server 18 will also initiate any records necessary to bill the end user for the interactive session.

Once the two-way data session is set up, the text server 18 and the DET 102 can exchange data messages relating to an interactive service. The text server will provide some interactivity via the two-way data communication link, but more extensive interactivity is available through use of selected information carried through one of the broadcast channels. In this regard, the text server 18 will provide instructions to capture application software from one or more of the broadcast channels, and the terminal 100 will utilize information from the captured software to process and present selected audio and video information from at least one broadcast channel.

In one example, the text server 18 might transmit back a text page, through the data network 16 to the terminal 100. The page would provide a welcome message and at least a first level menu for use in selection of the VIP's interactive services. The user operates the remote control to input selection information, and the terminal 100 transmits the inputs back through the data channel to the text server 18. In response to a selection of a specific interactive service, the text server 18 transmits an instruction to the terminal 100 to select a channel carrying the software and related information for the selected service and to select the packets relating to that service from the stream carried on that network channel. In response to at least some messages from the DET 102, the text server 18 will control one or more elements of the source 11 (for example the server 12) to transmit selected information through the broadband channel to the calling terminal 100 for presentation via the television set 103.

To facilitate an understanding of the application download and interactive application features it is useful to consider the structure of the set-top terminal 100 in more detail. A preferred network implementation is discussed later.

Figure 6:
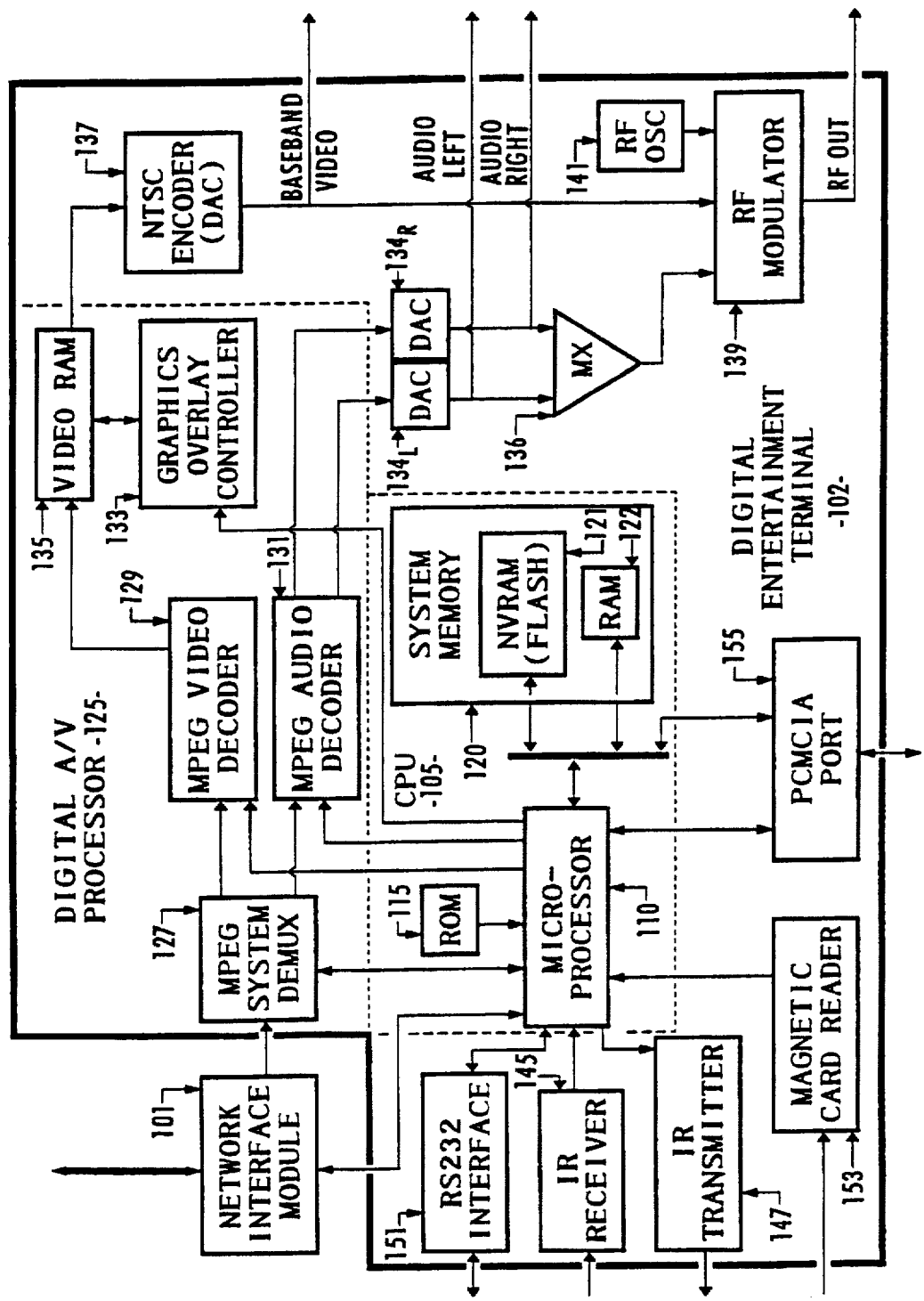
FIG. 6 illustrates a digital set-top terminal device in accord with the present invention.

The set-top terminal 100 shown in FIG. 6 will connect to a number of different types of digital networks, offering broadcast and point-to-point type services, such as disclosed in commonly assigned application Ser. No. 08/413,810 filed Mar. 28, 1995 entitled "Access Subnetwork Controller for Video Dial Tone Networks" (attorney docket no. 680-093B), the disclosure of which is incorporated herein entirely by reference. A specific preferred network embodiment is discussed in detail below with regard to FIGS. 8A and 8B.

For each different type of network, the terminal 100 includes a network interface module 101 providing the actual physical connection to the particular type of network. For example, in a fiber to the home network, the module 101 would include means for two-way conversion between electrical and optical signals and connections to one or more optical fibers for the necessary two-way transmission. However, the network interface module might be modified for a non-physical communication link, for example, via satellite-to-antenna, especially in rural areas. In the preferred network discussed below, the NIM 101 provides the connection to a coaxial type drop cable.

The network interface module 101 will also perform any format conversion necessary between signal formats utilized by the network and signal formats used within the DET 100. For example, in the switched digital video type network disclosed below with regard to FIGS. 8A and 8B, the network interface module 101 will include means to receive and process a baseband 180 Mbits/s broadband data stream, select a DS-3 from that stream, and process and convert a selected ATM cell stream into MPEG II bit stream for further processing by the DET 102.

The network interface module 101 also provides two-way signal conversion and formatting for control signalling between the DET and NIM and a control signaling channel through the particular network. For example, the network interface module 101 would include means to multiplex and demultiplex signals for transmission/reception over a coaxial cable or optical fiber. The control signaling channel is also selectively used for low-speed two-way data communications, for example for interactive text services and related control of interactive applications downloading.

In the illustrated embodiment, the network interface module 101 presents two connections to the DET 102, a high bit rate broadband connection and a low bit rate signaling and data communication connection. The broadband connection is a one-way downstream only connection, but the low-bit rate connection is a two-way connection.

The network interface module 101 takes the form of a plug in module. In one embodiment, the module 101 would be similar to a daughter board or option card which can be plugged into a back plane of a personal computer (PC). In such an embodiment, typically a technician could replace the module in either the field or the shop, to modify a set-top terminal device 100 to connect to and communicate over a different network, and the technician would modify associated communications control software in the system memory. Alternative implementations may use a user replaceable cartridge type network interface module, similar to a video game cartridge, which may include memory in the module for storage of the communications control software. As a further alternative, the network interface module could include a digital signal processor controlled by the CPU of the DET 102 and input/output connections compatible with all of the digital broadband networks currently available. Downloaded operating system software stored in the system memory of the DET controls operations of the digital signal processor to send and receive signals in accord with the particular network to which the subscriber chooses to connect the set-top terminal device 100.

The DET 102 includes a CPU 105, comprising a 486, PENTIUM™, or Motorola 6800 Series microprocessor 110 and associated system memory 120. The system memory 120 includes at least 2 mbytes of volatile dynamic random access memory (RAM) 122 and 1 mbyte of non-volatile random access memory (NVRAM) 121. In the preferred embodiment, the NVRAM 121 is a flash memory device. The CPU 105 also includes a read only memory (ROM) 115, either as a separate element connected to the microprocessor 110 as shown or as an element within the microprocessor 110. The ROM 115 stores "loader" programming needed to control wake-up. The non-volatile RAM 121 stores the operating system for the microprocessor 110. In operation, the volatile RAM 122 temporarily stores applications programs for execution by the microprocessor 110 as well as related data files; and during operating system download operations (if available), the RAM 122 temporarily stores the new operating system.

In the preferred embodiment, the operating system for the DET 102 includes a version of a PC type operating system, e.g. OS-9. In addition, the operating system for the DET 102 includes the various drivers necessary for the DET microprocessor 110 to operate the associated peripherals, e.g. the Digital Audio/Video Processor 125, the Personal Computer Memory Card Industry Association (PCMCIA) port 155, the RS-232 transceiver 151, etc. The set-top operating system also includes the resident cable television emulation software, i.e. as needed to facilitate reception of broadcast programs through the particular network and provide other necessary communications with nodes of the particular broadcast and two-way data communication network(s). This operating system is stored in a portion of the non-volatile RAM 121 having a relatively high level of protection.

The use of non-volatile RAM protects against loss due to power failures, etc. Also, the storage in the memory is carefully managed to protect the resident software, by restricting write and/or over-write access. Preferably only the set-top vendor can rewrite the operating system and resident application stored in the non-volatile RAM 121. Typically, the set-top vendor and the network operator work together closely to insure compatibility of the operations controlled by the resident software with the network operations, thereby insuring network integrity.

The DET 102 stores downloaded application software in random access memory (RAM) 122. The RAM 122 has a much lower level of protection. Typically the RAM 122 is a dynamic random access memory (DRAM), not a non-volatile memory. Also, write privileges for this portion of memory are open to all information providers on the network.

The downloaded application code or program that runs in the DET 102 is typically referred as the 'non-resident' application. To provide security to the network, only the resident application communicates with elements of the network, such as the HDTs in the preferred network discussed more fully below. The resident application, for example communicates with the network to request and effect channel changes and to set up and tear down two-way text communications with a server such as server 18 in FIG. 1.

The downloaded or 'non-resident' application includes a standardized protocol interface to communicate with the resident application. As such, the 'non-resident' application includes a number of calls requesting that the resident application perform selected ones of its standard operating functions. In the preferred implementation of this interface, the calls provided by the 'non-resident' application simulate user inputs through the keyboard of a remote control (not shown). For example, one such call might specify a channel change and the logical number of the target channel, in a manner analogous to activation of channel selection keys on the remote control.

When running, the non-resident application processes all actual user input key presses from the remote control except for certain reserved keys. The reserved keys include the 'POWER,' 'EXIT' and 'HOLD' keys which allow the user to directly activate the resident application. For example, during execution of the non-resident application, the resident application will respond to user activation of the 'POWER' key by suspending non-resident application and executing the normal power-down routine of the resident application. Similarly, activation of the 'EXIT' key will trigger the resident application to suspend the non-resident application and resume control of DET operations.

Activation of the 'HOLD' key will trigger the resident application to suspend the non-resident application and resume control of DET operations. In this mode, the current state information of the non-resident application at the time a suspension is stored in scratch pad memory in RAM 122. In response to a subsequent activation of the 'HOLD' key, the resident application reactivates the non-resident application at the state thereof at the time of the first activation of the 'HOLD' key. In this manner, the user can hold and resume the interactive service implemented by the non-resident application. Stated another way, the user can toggle between the resident and non-resident applications.

A digital audio/video (A/V) signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames of video RAM 135.

The MPEG system demultiplexer circuitry 127 recognizes packets in the MPEG data stream received over the broadband channel through the network interface module 101 and routes the packets to the appropriate components of the DET 102 based on the PID values of the respective packets. For example, the MPEG system demultiplexer 127 circuitry recognizes audio and video packets in the MPEG II data stream and routes those packets to the decoders 129, 131, respectively. The MPEG system demultiplexer 127 routes private data, such as downloaded executable code and associated data for an interactive application, to the microprocessor 110.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from the microprocessor 110. The MPEG video decoder 129 will internally include at least two frames (e.g. 2 Mbytes or 16 Mbits) of RAM (not separately shown) for use as a frame reorder buffer during the MPEG video decoding process, and the MPEG audio decoder 131 also may include some buffer memory.

The video RAM 135 is not a specialized "video RAM" as that term is sometimes used in the television art. The RAM 135 is actually a standard digital data RAM, of appropriate size, which is used in the DET to store digitized frames of video data. The RAM within the MPEG video decoder 129 likewise consists of standard digital data RAM.

The graphics overlay controller 133 produces displays of text and graphics data, such as text received from the server 18, in response to instructions from the CPU 105. The video RAM 135 sequentially receives each frame of digitized, uncompressed video information, as output from the MPEG video decoder 129. The video RAM 135 also receives digital information and read/write control signals from the graphics overlay controller 133 representing the several planes of text and graphics information and combines that information with the frames of decompressed video to produce composite video frames.

The graphics overlay controller 133 and the video RAM 135 actually cooperate to manipulate five different planes of video information, four of which can be active at any one time, to produce the composite video frame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overly controller 133. In this last situation, the graphics overlay controller would deactivate the backdrop plane.

Under certain circumstances, the video RAM 135 also serves to freeze video frames. For example, when a video transmission ends for some reason, the RAM 135 will contain the video and associated graphics information for the frame last received and displayed. The DET 102 can continue to output this frame as a still video output signal for some period of time. This capability is also used to produce still or 'freeze' frame video displays for certain interactive applications.

The DET 102 also includes audio and video digital to analog converters and appropriate drivers to produce output signals compatible with a conventional television set. Specifically, the converter and driver circuitry of the DET 100 includes audio digital to analog converters (DAC's) $134_L$, $134_R$, an audio mixer 136, an NTSC encoder 137, and an RF modulator 139.

The DAC's $134_L$ and $134_R$ receive the uncompressed left and right digitized audio signals output by the MPEG audio decoder 131. In response, the DAC's $134_L$ and $134_R$ produce baseband analog audio signals for output to individual baseband output terminals. The audio mixer 136 also receives the baseband audio signals from the DAC's $134_L$ and $134_R$. The mixer 136 combines the left and right analog audio signals to produce a monaural audio signal as the audio input to RF modulator 139.

The NTSC encoder 137 also performs a digital to analog converter (DAC) function. In response to the digitized video output signals from the video RAM 135, the NTSC encoder 137 produces a baseband analog video signal in standard NTSC format. The baseband NTSC video signal is supplied to an output terminal of the DET 102. The baseband NTSC video signal is also supplied to the RF modulator 139. The RF modulator 139 responds to the mono audio signal, the NTSC video signal and an RF signal from a local RF oscillator 141, to produce a selected standard RF television signal on an available TV channel, typically channel 3 or channel 4.

The type of connection of the DET 102 to the television set depends on the capabilities of the user's television set. If the user has a monitor type television capable of receiving baseband video and stereo audio inputs, the appropriate terminals of the television would connect directly to the video and audio output terminals of the DET 102. If the subscriber does not have such a television monitor, then the RF output of the modulator 139 would connect to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET 102 also includes means to receive selection signals from a user, and under at least some circumstances, transmit appropriate data signals over a narrowband channel through the particular video network. For example, the DET 102 may send and receive control data through a signaling channel on the subscriber's loop or drop cable. In the preferred embodiment, a switching element of the network routes selected broadcast channels to the set-top 100. The DET 102 provides selection signals to the NIM 101 for upstream transmission over the signaling channel to that switching element to identify a requested channel. In a similar fashion, the set-top terminal will transmit upstream signaling information through the signaling channel for transport through the network to a text server 18 operated by a video information provider offering the interactive application services.

In the embodiment illustrated in FIG. 6, the DET 102 includes an infrared (IR) receiver 145. The (IR) receiver 145 responds to input signals from a user operated IR remote control device (not shown) similar to that used today for controlling televisions and video cassette recorders. In response to the IR signals, the receiver 145 produces corresponding digital data output signals. The microprocessor 110 interprets the digital data signals by the IR receiver 145 as input commands. The precise interpretation of specific command signals can vary based on the downloaded applications programming and/or the operating system software currently stored in the system memory 120. For example, in response to certain input commands, the microprocessor 110 controls cursor position and alphanumeric information displayed as graphics and text on the associated television set. The microprocessor 110 will also respond to an appropriate input command from the user to formulate a message for upstream transmission though the network interface module 101 and the signaling channel of the particular connected network, e.g. to select a broadcast channel.

The set-top terminal device 100 of the present invention is an open interface device in that it interacts with equipment of a large number of service providers (often referred to as "VIPs") to offer users a wide array of video and interactive services. In the preferred embodiments, the digital entertainment terminal (DET) 102 is a programmable device to which different individual video information providers (VIPs) can download applications software, and at least one VIP or the network operator (the party selling the set-top device to the end user) may download the operating system software.

In the ROM 155 and/or a relatively high-level write protected portion of the NVRAM 121 (e.g. sector 0 of flash memory), the DET will store a loader program similar to the bios of a PC. The NVRAM 121 will also store the operating system. The loader program and operating system in the ROM and the non-volatile RAM will include sufficient programming to control initial communications and define interfaces and drivers, e.g. for graphics to define the base line functionality of the DET for all service applications the DET will run. This stored software also includes the resident application, which in the preferred embodiment is a CATV-like broadcast program reception routine appropriate for the particular network connected to the set-top terminal 100. The ROM or the most write-protected portion of the NVRAM may also store an operating system upgrade routine for controlling a DET process of upgrading the operating system through a broadcast channel download operation.

The DET 102 of the present invention may also include a number of additional interface devices. In the example illustrated in FIG. 6, the DET 102 includes an IR transmitter 147. The transmitter 147 responds to digital data signals from the microprocessor 110 and outputs corresponding IR signals for wireless transmission. The IR transmitter 147 and IR receiver 145 may operate together to provide a two-way wireless data communication link to some remote device, such as a personal data assistant (PDA) or pocket organizer. Alternatively, the IR transmitter may send signals to a remote display device for use in a service not requiring the TV set. For example, in an audio on demand service, the IR transmitter would send display data to an LCD display located near the user's stereo system.

The illustrated DET also includes an RS-232 transceiver or interface 151 connected to the microprocessor 110. An RS-232 port is a standardized two-way serial data interface typically used for connecting computers to peripheral devices, such as modems. In the present system, the RS-232 interface 151 might provide a serial data connection to an external personal computer (PC), such that the DET permits communications between the PC and the broadband network. Alternatively, this port might connect the DET to a printer, e.g. to print coupons during home shopping/browsing services. A hand-held diagnostic terminal might also connect to this port during servicing of the DET. The communications and protocols offered by the DET through the interface 151 would be controlled by the operating system and applications program software downloaded into the system memory 120.

FIG. 6 also shows the DET 102 including a magnetic card reader 153 connected to the microprocessor 110. This reader 153 could be used to scan credit card information encoded on magnetic strips on commonly available credit cards. In a home shopping and purchasing service, controlled by the downloaded software, the user would scan his or her own credit card through the magnetic card reader 153 as part of the payment operations. The reader could also have magnetic write capabilities to perform debit card operations.

The illustrated DET 102 further includes a personal computer memory-card interface adapter (PCMCIA) port 155. This is a two-way interface for connection to and communication with a flash memory module, such as is now incorporated into advanced "smart card" devices. In a medical service, a user might communicate with a medical information database through the DET 102 and the broadband network. The user's personal medical history information could be read from the smart card and subsequently updated on the smart card, through the PCMCIA port 155. Another use of this port might involve communication to a connected video game system to download video game software to the video game system and/or play interactive video games. Although specified as a "memory" port and mapped by the CPU as part of its system memory space, the devices connected to this port 155 can have other data processing capabilities, e.g. buffering and modem communication capability. A technician may also use a PCMCIA card to load operating system software into the NVRAM 121, e.g. when there is a fatal flaw in the currently stored software.

The PCMCIA port 155 can support speeds up to 20 Mbytes/s. Another use of this port would be for connection to an Ethernet card or other Local Area Network (LAN) card to permit data communications between the DET 102 and one or more computers. The set-top 100 would provide the computers with communications services through the broadband network, for example to receive high speed downloads of new or updated software for those computers. Although similar functions are possible through the RS-232 transceiver 151, the data rate through the PCMCIA port 155 is much higher.

Figure 7:
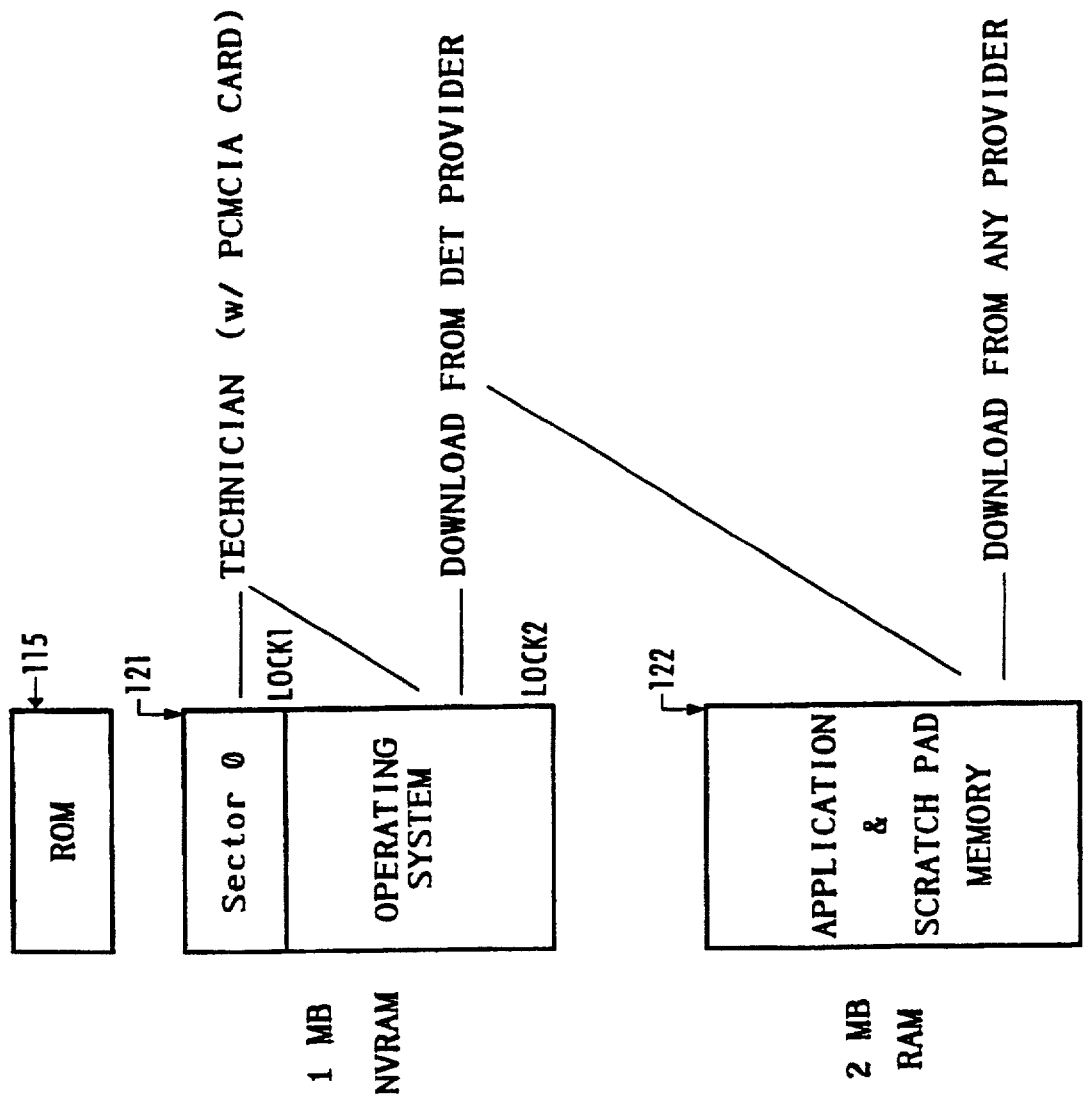
FIG. 7 shows a memory layout for the digital entertainment terminal and an associated diagram of functions involved in memory management and software downloading in accord with the present invention.

FIG. 7 shows the segments of memory in the DET 102. The non-volatile portion of the memory consists of the ROM 115 and 1 mbyte of non-volatile RAM 121 as discussed above. Preferably, the non-volatile RAM 121 consists of 1 mbyte of flash memory. The volatile portion of the memory consists of 2 mbytes of DRAM 122.

The use of flash memory in the preferred embodiment facilitates control of the write operations for different programs stored in the sectors of the memory 121 as a form of memory access control. Access to the different programs is limited by different types of flash memory "LOCKs," each of which requires a predetermined bit pattern to unlock the write operation and permit write access to the memory sectors.

The ROM alone or in combination with a write-protected portion of the NVRAM stores a loader program for controlling many of the wake up functions of the CPU 105. In the preferred embodiment, the write-protected portion of the NVRAM is sector 0. To write code to sector 0 requires a bit pattern, corresponding to 'LOCK1' shown in FIG. 7, which is available only to a technician. The other sectors of the flash memory type NVRAM 121 store the resident software (the operating system and the resident application). A bit pattern providing authorized access to write code in the other sectors, corresponding to 'LOCK2' shown in FIG. 7, will not enable writing of code to sector 0. The use of these different bit patterns to control the write operation to the sectors of the flash memory effectively limits who may access the various sectors.

The loader program is analogous to a BIOS (basic input/output system) in a PC. The loader program provides initial instructions to the microprocessor 110 to carry out a series of hardware diagnostics during an initial boot routine and to boot up the operating system stored in the NVRAM 121. If faults are detected, the loader routine will cause display of error codes and instructions on the associated television screen. For example, if the loader routine results in detection of a network error, the DET might generate a display instructing the subscriber to call a telephone number assigned to the network operating company together with a four digit code indicating the type of network fault, e.g. lack of a signaling channel or lack of a broadband channel. Alternatively, if faults in the DET 102 are detected, the display would instruct the subscriber to call a telephone number assigned to the DET vendor together with a four digit code indicating the type of DET equipment fault, e.g. operating system memory error.

In the presently preferred embodiment, the ROM 115 or sector 0 of the flash memory type NVRAM 121 also stores an operating system upgrade routine. The upgrade routine includes information and instructions necessary to extract operating system information from a broadcast MPEG data stream, as discussed in more detail in the 08/498,265 parent application.

Occasionally, it may be necessary for a technician to load software into the DET, for example when the DET has failed due to a fault in the operating system software stored in the NVRAM 121. In practice, the technician turns the set-top 100 off and inserts the PCMCIA memory card in PCMCIA port 155. The technician then turns the set-top device 100 back on. In the currently preferred implementation, the PCMCIA card consists of 2 Mbytes of flash memory and contains the operating full system. The software stored in this card also includes the portion of the loader or boot routine and/or the operating system upgrade routine normally stored in sector 0 of the flash memory of the DET 102.

The 2 Mbyte RAM 122 serves principally as a scratch pad memory and as storage for applications software (e.g. executable code and related data). The application software is downloaded to the DET 102 through the broadcast channel in the same manner as the operating system from the same provider offering the operating system upgrade service, or any other VIP may download application software through another broadcast channel.

Figure 8A:
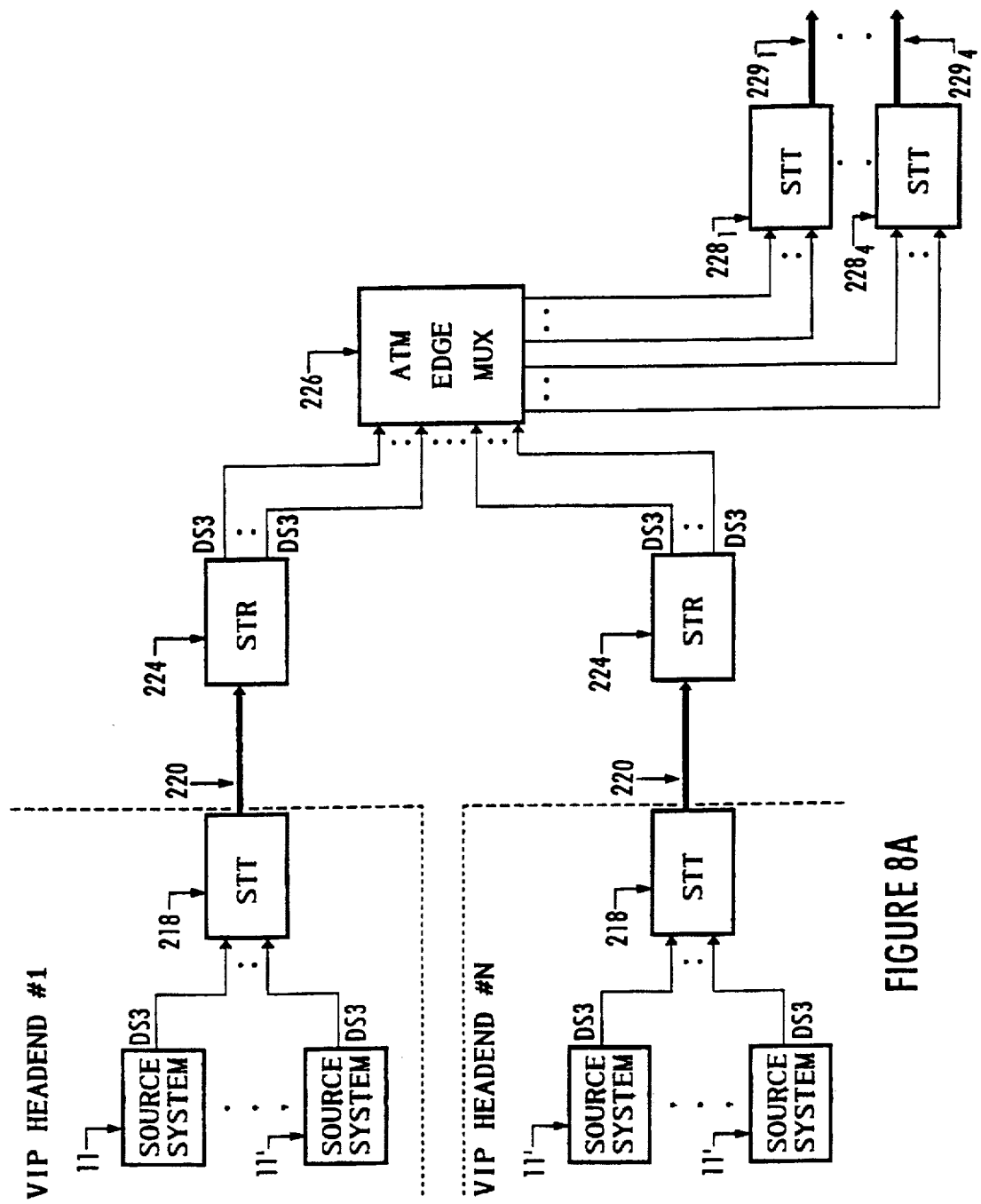
FIGS. 8A and 8B together depict a block diagram of a full service digital broadband network in accord with a preferred embodiment of the present invention.
Figure 8B:
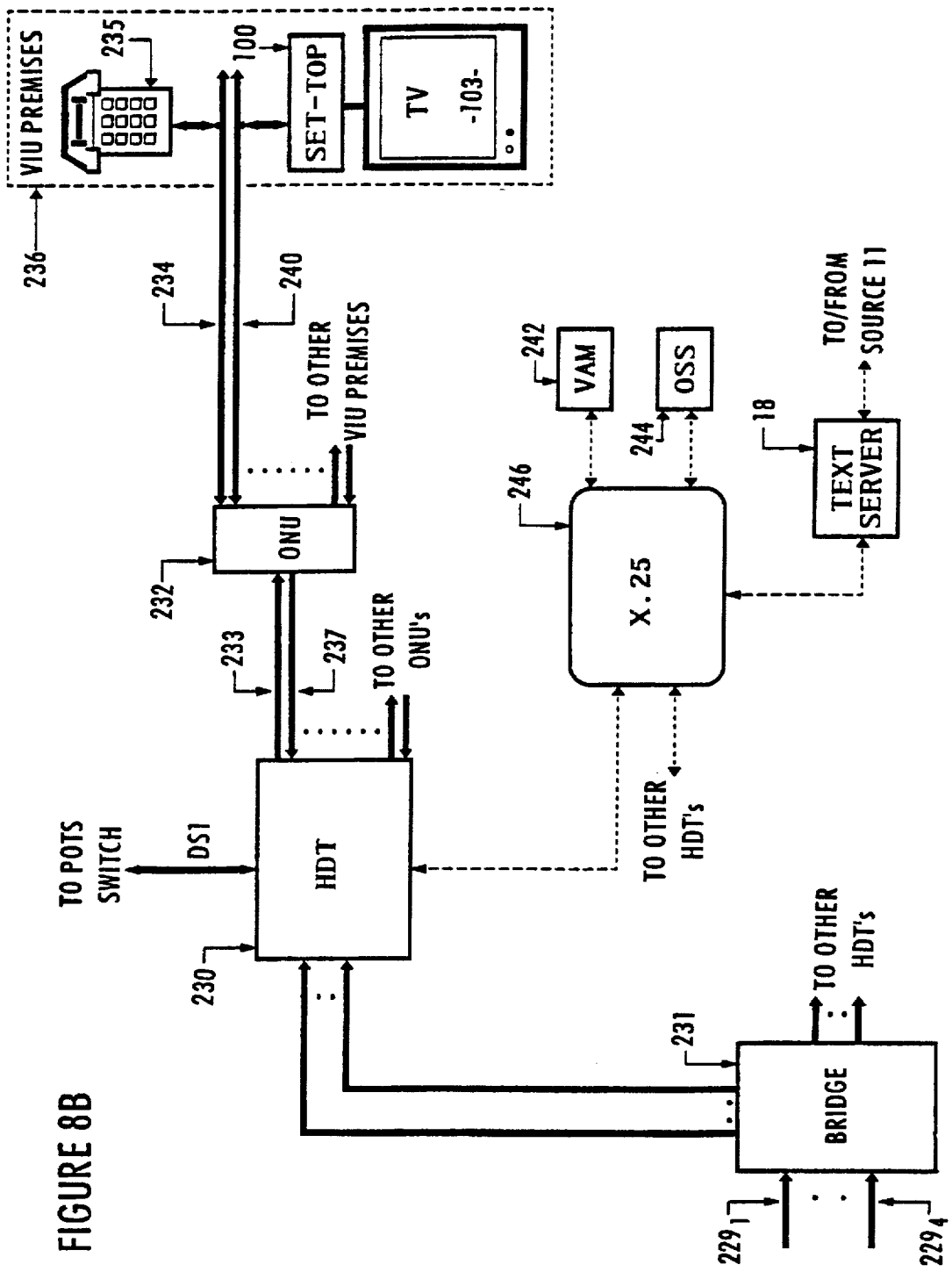

FIGS. 8A and 8B together illustrate a preferred architecture for a full service network providing the terminal operating system downloading service in accord with the present invention. The illustrated network provides transport for broadband services including broadcast video and IMTV type services, such as video on demand. The network also provides interactive text services and voice telephone services.

The illustrated network comprises an ATM backbone network and a local loop network. For broadcast services, the ATM backbone network includes an ATM edge device 226 and optical fibers 220 from the VIP headends to that edge device. The ATM backbone network includes four optical fibers $229_1$ to $229_4$ carrying broadcast programming from the ATM edge device 226 to a large number of host digital terminals (HDT's) 230 (only one of which is shown in FIG. 8B).

The local loop network consists of the HDT's 230, two-way optical fiber pairs 233, 237 between the HDT's 230 and optical network units (ONU's) 232, and coaxial cables 240 and twisted wire pairs 234 connecting the ONU's to the subscriber premises equipment. Control processor elements (not shown) within the HDT's 230 and a video administration module (VAM) 242 control the broadcast services.

Signaling communications between the DET's 239 and the serving HDT 230 utilize a consumer electronics (CE) bus protocol. In the presently preferred embodiment, signaling communications between the other nodes of the network ride on an X.25 packet switched data network 246. The communications through the data network 246 include two-way low-speed (e.g. text) data communications to and from one or more servers 18. In future implementations, instead of the X.25 data network 246, an ATM switch will carry the signaling and data traffic together with interactive broadband traffic.

For simplicity and ease of understanding, it is assumed here that the network is set up to transport broadcast services from two VIPs' headends. In practice there may be more than two broadcast VIPs on the network together offering at least 384 channels of broadcast programming. Each of the broadcast video headends includes one or more of the source systems 11 or 11' discussed above relative to FIGS. 1 and 2. Each source system 11 digitally encodes up to six audio/video programs in MPEG II format, and at least one of the sources 11' encapsulates the software data carousel containing interactive applications software and possibly operating system information, encapsulated in MPEG II transport packets. As discussed above, each encoder system includes an ATM multiplexer for adapting the MPEG packets into a single ATM stream at a DS3 rate.

In the illustrated example, the DS3 is actually a one-way asynchronous bit stream. The transmission of ATM cells in an asynchronous DS3 signal requires a common clock reference in order to ensure frame alignment between the ATM multiplexer and a super trunk transmitter 218. The ATM mux therefore presents the MPEG II packet channels in ATM cell format in accordance with a physical layer convergence protocol (PLCP). The PLCP is a framing structure used to ensure that ATM cells are aligned with respect to a corresponding video frame, even though there may exist drifting of a start and end of a typical DS3 frame. Specifically, the PLCP references a DS3 header and identifies the location of each ATM cell with respect to the DS3 header. Since the DS3 frame contains a maximum of twelve ATM cells, the PLCP notes the location of each of the twelve cells with respect to the DS3 header. Therefore, even though there may be DS3 frame drifting, the PLCP ensures alignment, from a cell perspective, between the cell layer and the DS3 frame so that each of the twelve ATM cells within each DS3 frame can be located.

All broadcast service type video information providers (VIPs) supply programming to the network in the form of one-way DS3 rate, MPEG II encoded ATM streams such as that output by the source systems 11. The DS3 bit stream from each system 11 goes to one input of a super trunk transmitter (STT) 218. As discussed below, the STT 218 combines a number of DS3 ATM cell streams into one higher rate bit stream and converts the electrical signals to optical signals for transmission over a trunk fiber 220. One broadcast VIP may have a number of STT's 218, and the network will actually carry optical broadcast streams from multiple broadcast service VIPs.

If the optical transmissions are SONET compliant, the super trunk transmitters 218 and super trunk receivers 224 would operate at an OC rate to transport a standard number of DS3 bit streams. For example, OC-12 equipment will transport 12 DS3 bit streams, OC-18 will transport 18 DS3 bit streams, etc. It would also be possible to use an asynchronous optical protocol.

The preferred embodiment uses super trunk transmitters and receivers manufactured by Broadband Technologies, Inc. of Research Triangle Park, N.C. The preferred super trunk transmitters perform a bit stream interleave type multiplexing. The preferred super trunk transmitters (STT's) 218 are capable of receiving DS3 bit streams from up to sixteen sources, for example up to sixteen source systems 11. Each super trunk transmitter 218 combines the input DS3 rate bit streams into a single higher rate bit stream, converts that electrical stream into an optical signal stream and transmits the optical stream over a fiber 220. The optical fibers 220 each transport up to 16 DS3 streams, wherein each DS3 includes six 6 Mbits/s MPEG II encoded transport streams, for a maximum capacity on the fiber of 96 channels per fiber.

According to the preferred embodiment, the network includes a plurality of parallel trunk fibers 220 from different STT's 218 servicing a variety of VIPs. Each fiber 220 goes to a super trunk receiver 224. A different set of input broadcast broadband (e.g. television) signals are encoded and multiplexed in a manner similar to that discussed above to produce the combined DS3 bit stream (up to 96 channels) for transport over each respective optical fiber 220. The network preferably will service up to 50 VIPs.

The trunk fibers 220 are routed to super trunk receivers 224, each of which recovers up to sixteen DS3 bit streams from the corresponding optical signal stream. Each super trunk receiver 224 supplies each recovered DS3 rate stream to one input node of the ATM edge device 226. The preferred ATM edge device 226 receives at least sixty-four DS3 inputs from the STRs 224. The ATM edge device 226 performs policing and grooming on the input ATM cell streams.

The ATM edge device 226 monitors incoming DS3 data streams and determines whether ATM cells within the data streams should be passed to the network or blocked. This functionality of the edge device 226 serves to police incoming cells based on their VPI/VCI values. The edge device will pass cells only if the VPI/VCI values in the cells correspond to a value indicated as valid in the data tables programmed into the edge device. If a cell does not have a valid VPI/VCI value for a currently active program channel, the edge device will not pass that cell to an output port.

Also, the ATM edge device 226 performs policing of DS3 ATM cell streams by monitoring the data rate of incoming data streams from VIPs. For example, if one VIP has subscribed by contract to transmit a particular channel at a data stream rate of 6 Mbits/s, the ATM edge device 226 will prohibit or drop ATM cells having the assigned VPI/VCI value that are transmitted above the subscribed bit rate; in this case, a 6.5 Mbits/s stream would be rejected as an unauthorized rate.

In addition, the ATM edge device 226 provides a grooming function, whereby ATM cells are analyzed, on a cell-by-cell basis, to determine if they should be transmitted on the network. Specifically, each ATM cell having a valid VPI/VCI value is switched through the ATM switch fabric assigned to carry the program identified by the VPI/VCI value. The ATM edge device 226 combines a specified six ATM cell streams into a DS3 bit stream for output on each DS3 output port.

This ATM cell mapping enables DS3 ATM cell streams that are transmitted at less-than-full capacity on the trunk fibers 220 to be mapped onto output DS3 streams operating at full capacity. Although each optical fiber 220 has a capacity of transporting up to 16 fully loaded DS3 ATM streams, at least one optical fiber 220 from two or more VIPs typically will not be operated at capacity, when broadcast VIPs do not offer an even multiple of six channels or when VIPs using the optical fibers have varying bandwidth requirements over time. The ATM edge device 226 processes all incoming DS3 bit streams from all of the optical fibers 220, and maps the ATM cell streams from those inputs into at least one and preferably sixty-four condensed, or combined DS3 output bit streams for further transmission through the network. Thus, the ATM edge device is able to fully load the optical fibers $229_1$ to $229_4$ serviced by the STT's $228_1$ to $228_4$ to fully load the downstream broadcast capacity of the network.

The ATM edge device 226 outputs each groomed DS3 stream to one input of a super trunk transmitter (STT) 228 similar in structure and operation to the STTs 218 discussed above. In a preferred embodiment, each DS3 from the edge device 226 goes to one input of the four STT's $228_1$ to $228_4$. The preferred embodiment can carry up to 384 broadcast program channels over a capacity of 64 DS3 signal paths (four fibers $229_1$ to $229_4$ each carrying sixteen DS3's in a manner similar to the maximum possible on each fiber 220). In that embodiment, the STT's $228_1$ to $228_4$ receive the 64 DS3 ATM streams from the ATM edge device 226, and output the ATM streams over four parallel optical fibers. SONET or other protocols could be used on the fibers $229_1$ to $229_4$ and/or the network could include additional fibers.

The ATM edge device 226 may comprise a relatively small capacity ATM switch. A more detailed description of the ATM edge device and its operation is disclosed in commonly assigned U.S. patent application Ser. No. 08/380, 744 filed Jan. 31, 1995 entitled "Full Service Network Using Asynchronous Transfer Mode Multiplexing" (attorney docket no. 680-109), the disclosure of which is incorporated herein in its entirety by reference.

The ATM edge device 226 outputs at least one DS3 stream of combined ATM streams and preferably 16 such streams to separate input ports on each of the four super trunk transmitters (STT's) $228_1$ to $228_4$. The ATM edge device 226 will preferably output up to 64 DS3 bit streams to the four STT's $228_1$ to $228_4$. Each particular STT $228_1$ to $228_4$ combines the input DS3 bit streams into an optical stream, in a manner similar to that of STTs 218, for transmission on one of the four fibers $229_1$ to $229_4$.

The signal stream on each optical fiber $229_1$ to $229_4$ is applied to a bridge circuit 231 (FIG. 8B) to supply the optical signal stream through corresponding trunk fibers to a large number of Host Digital Terminals (HDT's) 230 distributed throughout the serving area. The bridge circuitry includes passive bridging elements and may include active bridging elements.

The preferred embodiment utilizes HDTs manufactured by Broadband Technologies, Inc. of Research Triangle Park, N.C. Each HDT 230 handles up to 256 subscribers by switching DS3 bit streams carrying selected program channels onto optical fibers 233 to up to 32 optical network units 232 (ONUs) . The ONUs 232 transfer the DS3's over respective coaxial cables 240 to subscriber terminals 100 for display on associated television sets 103.

The downstream optical fibers 233 from the HDT 230 to each connected ONU preferably transport 24 DS3 ATM cell streams, e.g. using OC-24 SONET compliant equipment. Together, the downstream fiber 233 and an upstream fiber 237 also provide transport for two-way telephone communications and two-way signaling and data channels. In an alternate embodiment, the network might use a signal fiber between the HDT and each ONU and provide both downstream traffic and upstream traffic on that one fiber.

In the illustrated embodiment, the downstream optical fiber from the HDT 230 to each ONU 232 may use either an asynchronous optical protocol, or the synchronous (SONET) OC rate transport. The ONU's 232 provide appropriate interfacing between the voice channels on the fibers and twisted wire pair 234 for telephone service into the subscriber premises.

Each video information user (VIU) premises 236 is pre-assigned three DS3 slots on the downstream fiber 233 from the HDT 230 to the ONU 232 for broadband service. Each home or living unit 236 is preferably allocated a capacity of four set-top terminal devices 100, with at most three being active at any one time. A coaxial drop 240 for each premises 236 carries 180 Mbits/s baseband digital data, which will simultaneously transport three 45 Mbits/s DS3 rate bit streams. For a particular VIU premises 236, the three DS3 channels on the fiber from the HDT 230 to the ONU 232 and on the drop cable 240 are individually assignable to different set-tops 100 within the subscriber's premises 236. The ONU 232 performs optical to electrical conversion, separates out the DS3's received over the downstream optical fiber 233 from the HDT 230 and supplies the selected DS3 bit stream to appropriate channels on the coaxial cables 240 going to the respective subscriber premises 236.

For narrowband signaling information, the ONU 232 passes all of the downstream signaling and data received from the HDT 230 on fiber 233 through to all of the coaxial drop cables 240, so that for signaling and data the cables look like a common bus shared by all of the connected set-tops 100. In the downstream direction, signaling and/or data packets are interleaved with the ATM cell stream packets. In the upstream direction, the low-speed signaling and data channel on the coaxial cable 240 utilizes a different frequency portion of the spectrum from the downstream DS3 transmissions. The ONU 232 combines all of the upstream signaling and data packets from subscriber drop cables 240 into a digital data stream and transmits that data stream together with digitized upstream telephone service signals over the upstream fiber 237 to the HDT 230.

Each set-top 100 comprises a DET and NIM, as discussed above. In this embodiment, the NIM connects to the coaxial drop cable 240 to send control signals and/or upstream data signals to the ONU 232 and receive video and data signals from the ONU 232. The NIM includes means to selectively demodulate received data from an assigned one of the three DS3 slots on the coaxial cable 240 and an ATM demux for mapping selected ATM cells back into the corresponding MPEG packets. As discussed above, the DET includes an MPEG II audio/video (A/V) processor 125 (FIG. 6). Specifically, the ATM demux in the NIM 101 captures and processes ATM cells bearing specified VPI/VCI header information corresponding to the selected program channel from the DS3 stream. The MPEG system DEMUX 127 passes payload data from packets identified by the PID assigned for the program data to the appropriate decoder. The MPEG system demux 127 (FIG. 6) therefore sequentially reconstructs the frames for a particular video program from payloads of packets bearing the appropriate PID value and passes them to the video decoder. The video decoder 129 decompresses the compressed digital video information, and displays the decompressed digital video information in the appropriate format. The MPEG II audio decoder 131 decompresses audio information supplied from payloads of packets bearing the appropriate PID value by the demux 127, and the decoder 131 outputs the audio signal for presentation via the television 103. The DET microprocessor 110 receives and processes text data and any other user data carried in the MPEG transport stream.

Each set-top 100 includes means to receive selection signals from a user via remote control, and as noted above, the set-top responds by transmitting appropriate data signals over a narrowband signaling and data channel on the coaxial drop cable to the ONU 240. According to the preferred embodiment, the narrowband or low-speed channel uses the consumer electronics (CE) bus protocol. With the CE bus protocol, for example, the active set-tops 100 are assigned signaling time slots by the HDT 230, and each active set-top 100 transmits channel selections and other data upstream to the ONU 232 in its assigned slot.

The ONU 232 multiplexes the data signals from the set-tops it services together and transmits those signals to the HDT 230 over an upstream channel on an optical fiber 237. If the data represents selection signals, the HDT 230 responds to that data as outlined above, and stores data identifying each subscriber's selections for subsequent periodic uploading to a Video Administration Module (VAM) 242. The HDT's 230 connect to the VAM through a first X.25 packet data communication network 246.

The network illustrated in FIGS. 8A and 8B will also provide narrowband transport for voice and narrowband data services. A digital switch or an analog switch (not shown) will provide standard type plain old telephone service (POTS) for customers of the Full Service Network. The digital POTS switch provides a DS1 type digital input/output port through interfaces conforming to either TR008 or TR303. The DS1 goes to the HDT 230. The DS1 may go through a digital cross-connect switch (DCS) for routing to the various HTS's or directly to a multiplexer (not shown) serving a particular HDT 230. The multiplexer may also receive telephone signals in DS1 format from an analog switch through a central office terminal. The central office terminal converts analog signals to digital and digital signals to analog as necessary to allow communication between the analog switch and the rest of the network.

Although not shown, the telephone service multiplexer for an HDT 230 may multiplex a number of DS1 signals for transmission over one fiber of an optical fiber pair to the HDT 230 and to demultiplex signals received over the other fiber of the fiber pair. The fiber pairs between the HDT 230 and the ONU's 232 will also have a number of DS1 channels to carry telephone and narrowband data signals to and from the subscriber's premises. In addition to the video and interactive services, the ONU 232 will provide telephone signals and appropriate power to the subscribers' premises over the twisted wire pairs 234 connected to subscribers' telephone sets 235.

The operations of each HDT 230 are controlled by data tables stored within the HDT. The video information providers (VIPs) provision various services for their subscribers by establishing appropriate mapping and profile data in the tables in the HDT's 230. The VIPs, however, do not have direct access to the data tables within the HDTs. Instead, the VIP's access the VAM 242 through a personal computer interface 244 and the X.25 data communication network 246. The VIPs 210 provide provisioning data through the operations and support system (OSS) 244 to the VAM 242, and the VAM 242 periodically downloads that data to the appropriate HDTs 230.

The provisioning data downloaded to the HDTs 230 includes channel mapping information and subscriber authorization control information. The channel mapping information specifies what programs are carried on each ATM virtual circuit, within each DS3, on each respective optical fiber. The HDT 230 accesses the channel mapping information in response to each program selection by a subscriber to route the correct DS3 to the requesting set-top 100 and to inform the set-top 100 as to which virtual circuit within that DS3 carries the requested program. The authorization control data indicates which programs each subscriber is authorized to access, e.g. because that party has subscribed to the particular program service and is not delinquent in bill payments. When a subscriber requests a program, the HDT 230 checks this data to determine whether or not to supply the program to the subscriber's set-top 100.

In operation, the network administration and support personnel enter the VIP profile information including the VPI/VCI assignments in a database (not shown) and manipulate that database to define necessary routing tables for transport of the VIP's broadcast program channels through the network. The database then outputs appropriate information for programming the ATM edge device 226 and information for programming the VAM 242. The VAM 242 periodically updates the actual control tables in each HDT 230 via communications through the X.25 signaling network 246. In particular, the data downloaded to the HDTs 230 indicates the DS3's on each fiber. The data downloaded to the HDTs 230 also indicates the VPI/VCI values for each program channel within each DS3. In the preferred embodiment, the data in the HDT will also include an initial PID value used in capturing and decoding the MPEG II packets for each program channel, e.g. the PID value for the program map packet for the particular video program.

In operation, each time a subscriber turns on a set-top 100, the set-top transmits an appropriate signaling message upstream to the HDT 230. The HDT stores a table of valid equipment ID's for the set-tops it services. The signaling message transmitted to the HDT 230 at turn-on includes the equipment ID for the particular set-top 100. When the HDT 230 receives the initial signaling message from the set-top, the HDT executes a routine to initialize the set-top. As part of this initialization routine, the HDT 230 validates the set-top equipment ID and assigns one of the DS3 slots on the downstream fiber 233 to the ONU 232 to that set-top for as long as that set-top remains on. Also, one of the DS3's on the subscriber's coaxial drop cable 240 from the ONU 232 is assigned to the set-top 100 for the duration of communications.

At the same time, the HDT 230 will complete a two-way signaling communication link with the DET in the particular set-top 100. At least on the coaxial cable portion, the packets relating to the signaling link are identified by header information identifying the particular link, i.e. a signaling identifier assigned to this communication between the HDT 230 and the particular set-top 100. As part of the initialization routine, the HDT 230 sends one or more signaling messages to the DET in set-top 100 identifying the signaling channel assignment and the DS3 assignment. Specifically, for the signaling link, the HDT 230 assigns the next idle signaling ID to this call and informs the DET of that signaling ID assignment.

When a subscriber selects a broadcast program, the subscriber's set-top 100 transmits a channel request message, including the equipment ID of that set-top and channel selection information, upstream through the signaling link to the HDT 230. Using portions of the stored data tables, the HDT 230 checks to determine if the particular set-top is permitted to access the requested channel. The access decision may relate to whether or not the VIU has subscribed to the program service requested. Alternatively, the HDT 230 may execute a PIN/password routine discussed later to determine if the person currently operating the set-top is allowed access to the particular broadcast program service.

If the subscriber is permitted access to the requested channel, the HDT 230 switches the DS3 bearing the requested channel from one of the trunk fibers onto the DS3 assigned to the requesting set-top 100 on the fiber 233 going to the ONU 232 serving the particular subscriber. The ONU 232 in turn switches the assigned DS3 on the fiber 233 onto the DS3 assigned to the particular set-top 100 on the drop cable 240 into the VIU's premises 236. The HDT 230 addresses a downstream control message to the set-top using the assigned signaling call ID. The control message identifies the VPI/VCI of the requested program within the DS3 and the MPEG PID value for the MPEG PROGRAM MAP TABLE (PMT), so that the set-top 100 can select and begin decoding MPEG II transport packets for the selected program to produce standard signals for driving a television set 103 or for reception of software.

For a selected video service, the VPI/VCI value would identify cells relating to the selected channel, and the PID value would identify the program map. The NIM 101 (FIG. 6) selects cells having the specified VPI/VCI value and adapts those cells back into MPEG packets as discussed above. The NIM 101 hands off the 6 Mbits/s MPEG transport stream for channel 0 to the MPEG system demux 127. For a video service, this stream contains the audio and video information and may contain packets for related data, such as closed captioning. The DET 102 utilizes the downloaded PID value to capture and process the packet containing the program map table, and uses the data from that table to identify the PID value of packets containing the video and audio information. Using the PIDs for video and audio, the microprocessor 110 instructs the MPEG system demultiplexer 127 to route payload data from those packets to the appropriate decoder 129, 131 for processing and presentation of programming to the viewer through the television 103. The microprocessor 110 uses the PID value (if any) for private data to instruct the MPEG system demultiplexer 127 to route payload data from any packets containing data to the microprocessor 110 for further processing.

For an application download operation, the VPI/VCI value would identify cells relating to a channel, e.g. channel 022, and the PID value would identify the program map for the selected interactive application. The NIM 101 (FIG. 6) would select cells having the specified VPI/VCI value and adapt those cells back into MPEG packets as discussed above. The NIM 101 hands off the 6 Mbits/s MPEG transport stream for the selected channel to the MPEG system demux 127. In the preferred embodiment, this stream contains the audio and video information and packets containing application software for the interactive application service. The DET 102 utilizes the downloaded PID value to capture and process the packet containing the program map table, and uses the data from that table to identify the PID value of packets containing the actual application software code and any associated data. The microprocessor 110 uses that PID value to instruct the MPEG demux 127 to capture and forward application code and related data from the packets to the microprocessor 110 for storage in the RAM 122 and subsequent execution.

As noted above, the HDT 230 switches DS3's and instructs the set-top 100 what VPI/VCI values to use to capture cells for particular programs. The set-top 100 processes an assigned one of the three DS3 signals carried on the coaxial cable into the VIU's premises 236; and from that DS3, the set-top 100 captures cells having the VPI/VCI value that the HDT instructed it to capture. When a subscriber wants to switch channels, if the newly selected channel is in the DS3 stream already going to the subscriber's set-top, the HDT 230 provides the set-top with the new VPI/VCI value and PID value for the new channel. The set-top 100 can begin immediately capturing and processing cells bearing the new VPI/VCI and decoding payload data from those cells to present the program to the user via the television set or perform a software download operation, as necessary. If the selected channel is not in the DS3 currently going to the particular set-top 100, then the HDT 230 will switch the DS3 for the new channel from the correct incoming optical fiber onto the DS3 assigned to the set-top on the fiber 233 to the ONU 232. The ONU 232 supplies that new DS3 to the set-top via the currently assigned DS3 slot on the subscriber's coaxial drop cable 234 so that the set-top 100 will begin receiving the new DS3. Through the downstream signaling channel, the HDT 230 also informs the set-top 100 of the new VPI/VCI to permit the set-top to capture and process cells and begin decoding payload data from those cells to present the newly selected program to the user via the television set.

The illustrated network also offers interactive text (IAText) services, and in accord with the present invention, at least some of the interactive text services are enhanced through use of the software download facilities. For the text services, the HDT 230 stores a table identifying those broadcast channels which have associated text services. The resident application in the DET 102 includes a module or subroutine for processing related to setting up and conducting IAText sessions.

A user selects one of the channels having an interactive text service associated therewith in the normal manner, and the set-top terminal 100 transmits a normal channel selection request message to the HDT 230. The HDT 230 sets up the broadband communication link to the set-top terminal 100 as discussed above, and the HDT transmits a signaling message to the set-top terminal 100 instructing the terminal to display a prompt asking if the customer wants an interactive session. If the customer activates, the terminal remote control indicating assent, the terminal 100 so notifies the HDT 230 through the signaling channel. In response, the HDT uses the X.121 address of the interactive service VIP providing the selected broadcast channel service to initiate an X.25 data call through the network 246 to the VIP's text server 18. As part of the initial session request to the server 18, the HDT will supply the DET's X.121 address to the server.

In this manner, an X.25 signaling link is then set up for the set-top terminal 100 between the server 18 and the HDT 230. The HDT 230 associates the X.25 signaling call to the text server 18 with the established signaling call between the HDT 230 and the calling subscriber's set-top 100 and performs any necessary protocol conversion. For example, the HDT places downstream data from the X.25 call in packets identified with the signaling call ID assigned to the subscriber's set-top terminal 100 at turn-on and transmits those packets through the downstream fiber 233 to the ONU 232 and the coaxial cable 240 to the subscriber's premises 236. The HDT also routes upstream data from the terminal 100 over the X.25 virtual circuit to the text server 18.

During the interactive communication session between the subscriber and the VIP, the set-top 100 can transmit control signalling upstream through the ONU 232, the HDT 230 and the X.25 data network 246 to the text server 18. The text server 18 can send text data as well as signaling information, such as control data, to initiate a download operation downstream through the same path to the set-top terminal 100. The text server sends text data in VT-100 format.

Operating system comparability is checked only for IMTV. For interactive text services, the VIP's text server next initiates an interactive session with the calling subscriber's set-top terminal. For example, the server 18 might send one or a series of text pages back through the X.25 virtual circuit and the signaling link to the set-top terminal 100 for display on the television 103. The text page(s) might provide an initial welcome message and a menu of the VIP's interactive services. There may also be a PIN number routine to verify that the caller is an authorized subscriber.

The text server may initiate application download operations at any point during an interactive text session. In the preferred embodiment, the text server 18 initiates download of a shell application immediately after validation of the subscriber. The shell application controls menuing and selection functions, e.g. for selection of specific interactive services. The text server 18 initiates downloads of specific service applications in response to service selections by the subscriber working through operation of the shell application. Alternatively, the text server may initiate the first application download after the first specific service selection by the subscriber, and for convenience, the following discussion of a specific example assumes this later methodology.

The DET 102 may receive broadcast broadband transmissions in the normal manner and overlay text messages onto the video in response to signaling messages from the text server 18, or the DET 102 may present various text messages on a background screen. The user can input responses via the remote control or a keyboard on the set-top terminal, and the set-top terminal transmits the input messages upstream through the signaling link and the X.25 virtual circuit to the text server 18. For this discussion, assume that as a result of some such interaction, the user selects one of the VIP's interactive services, and the terminal 100 transmits a message identifying the selection to the server 18.

In response to the selection, the server 18 initiates its internal program operation relating to the selected service. The server 18 will continue at least some text interactions with the user through the two-way data communication. At appropriate times, the text server will provide instructions to the DET 102 to initiate software download operations. The DET 102 will also decode video and audio materials from the broadcast data carousel, either in response to direct instructions from the server 18 or more often under control of the downloaded application program.

To initiate a download operation, the text server 18 transmits an IAText 'STORE' message (see TR72540) through the X.25 virtual circuit and the signaling link to the set-top terminal 100. The STORE message instructs the DET 102 to conduct an application download procedure and provides a variety of control parameters utilized in that procedure. The interactive text module of the resident application recognizes the STORE message as a special command. That module suspends its own operation and activates a software module in the resident application for performing the download operation.

In order for the DET to correctly perform the broadcast application download, the DET 102 needs the following information:

1. The channel identifier for the broadcast channel carrying the data carousel containing the application file;

2. The PID for the MPEG II private data stream within the carousel that contains the download blocks of the application file;

3. The size (in bytes) of the DownloadDataBlocks; and

4. The size (in bytes) of the Download Image (this is the sum of the sizes of all of the memory modules contained in the data carousel, and does not include the size of the DSMCC DownloadDataBlock headers).

The STORE message includes at least this necessary information. After the DET 102 receives the STORE message, the DET parses the message to recover the necessary information. If the set-top terminal 100 is not currently receiving the identified channel, then the DET 102 initiates a channel selection operation through the network to receive the identified channel.

Assume for purposes of the present discussion, that the data carousel containing the materials for the selected application rides on a different broadcast channel. In response to the STORE message, the operating system software therefore formulates a channel selection message and provides that message to the NIM 101. The NIM 101 transmits the message in the appropriate signaling protocol format to the HDT 230. If the subscriber is permitted access to the requested channel, the HDT 230 switches the DS3 bearing the requested channel from one of the trunk fibers onto the DS3 assigned to the requesting set-top terminal 100 on the fiber 233 going to the ONU 232 serving the particular subscriber. The ONU 232 in turn switches the assigned DS3 on the fiber 233 onto the DS3 assigned to the particular set-top terminal 100 on the drop cable 240 into the VIU's premises 236. The HDT 230 addresses a downstream control message to the set-top terminal using the assigned signaling call ID. The control message identifies the VPI/VCI of the DS3 and the MPEG PID value for the MPEG PROGRAM MAP TABLE (PMT), so that the set-top terminal 100 can select and begin decoding MPEG II transport packets for the selected program to produce standard signals for driving a television set 103 or in this example for reception of software.

The NIM 101 (FIG. 6) selects cells having the specified VPI/VCI value and adapts those cells back into MPEG packets as discussed above. If the correct data carousel channel is already in the assigned downstream DS3 going to the set-top terminal 100, the NIM 101 will select and process or continue to so process the cells for that channel in essentially the same fashion. The NIM 101 hands off the 6 Mbits/s MPEG transport stream for the selected channel to the MPEG system demux 127. For the interactive service in the preferred embodiment, this stream contains the audio and video information for the selected application as well as packets containing code and data for the interactive application software.

Once the set-top terminal 100 begins receiving the channel identified in the STORE message, the DET 102 begins extracting the DownloadDataBlocks from the broadcast data carousel and reassembling the download image memory modules. The microprocessor 110 uses that PID value to instruct the MPEG demux 127 to capture and forward application software from the data packets to the microprocessor 110 for further processing. Specifically, the microprocessor 110 stores the software in the RAM 122.

Each of the DSMCC DownloadDataBlocks includes a block number in the header thereof. The download routine running in the DET microprocessor 110 utilizes these block numbers to place the recovered information in proper order in memory and to recognize the capture of all of the download file or 'image' as specified by the image size information in the STORE message.

In the memory management illustration of FIG. 7, any text server and broadcast data carousel can download application program software to the DRAM application memory 122 in the DET 102. The DET validates that it has correctly received all of the DSMCC DownloadDataBlocks in the download file. When sufficient reassembled module(s) reside in the RAM, the microprocessor 110 initiates execution of the downloaded application from the RAM.

The microprocessor 110 could initiate execution of the downloaded code when sufficient code has been received, even if the set-top terminal 100 is still receiving additional modules of the application from the broadcast channel. In the preferred embodiment, however, the microprocessor will receive and store the entire downloaded application file or 'image' before initiating execution of the application.

The download routine in the resident application provides a display message, for overlay on the currently displayed video, informing the user that a download is in progress. The download routine also performs several housekeeping functions during the download. As noted, the set-top 100 validates the received software. If a validation fails, the download routine will reinitiate the download. The routine will make up to three attempts to download the software before terminating if still unsuccessful. In the event of such a failure, the routine will provide an error message for display to the user. The routine may also initiate an error message for transmission through the network to the text server 18 indicating the failure. The download routine may also perform various timing functions, e.g producing one or more error messages if it does not find the identified packets for the download on the data carousel channel within a set time period or if there is an interruption in receipt of packets for a set period before completion of a download operation.

In a successful download operation, the DET 102 loads the received OS-9 memory modules and executes the first module as a child process of the resident application. Under subsequent control by the downloaded application, the microprocessor 110 will occasionally instruct the MPEG system demultiplexer 127 to route information from video and audio packets to the appropriate decoder 129, 131 for processing and presentation of programming to the viewer through the television 103, based on PID values from the program map and on time values. The data included in the downloaded modules, for example, includes PID values and time stamp values for use in various operating states of the non-resident application, such as in response to predetermined selections input by the user.

The resident software in the NVRAM 121 includes an OS-9 subroutine module that provides the actual interface between the resident and non-resident applications. The non-resident application invokes the functions of the subroutine module to request that the resident application software perform certain tasks, such as channel change, initiate/terminate an IAText session, etc. The actual interprocess communication (IPC) function between the resident and non-resident applications is implemented in the subroutine module and is hidden from the non-resident application.

The software interface subroutine module implements at least the following function calls for use by any downloaded or non-resident application.

Service request calls: These calls request the resident CATV application software to provide a service, for example, change a channel. This category consists of the dla_channelchange( ), dla_initIATextSession( ), dla_termIAText Session( ), dla_squelch( ) and dla_readcard( ) functions. Each service request call has a matching status call. All service request calls are asynchronous to allow the non-resident application to continue with local processing until the request has been successfully serviced. The last parameter of each service request call is of type signal_code. The resident CATV application software uses these signals to notify the non-resident application when it has completed servicing the request. On receiving a signal, the non-resident application must call the matching status function call.

Status calls: A status call gets the status (success or failure) of a service request call. This category consists of the dla_getChannelStatus( ), dla_getIATextStatus( ), dla_getTermIATextStatus( ), and dla_getSquelchStatus( ) and dla_getCardStatus( ) functions.

There are 3 other calls that are part of the DET applications program interface (API) library: dla_init( ), dla_term( ), and catvSignalHandler( ). The first two calls dla_init( ) and dla_term( ) are used to initialize and terminate the use of the CATV subroutine module. In addition, the dla_init( ) call notifies the resident CATV software that the non-resident application has reserved a group of signals for its (resident CATV software) use. After the non-resident application receives a signal in this group, it notifies the resident CATV software via the catvSignalHandler( ) call.

Additional description of several of the function calls follows.

The dla_init( ) function call initializes the API library. It must be called before any other API call. The resident CATV software returns a handle which must be used in all subsequent API calls. The signal sig_base is the base of a group of signals in the range sig_base to sig_base+15 that are reserved by the non-resident application for the resident CATV software. The non-resident application must call catvSignalHandler( ) after receiving a signal in this range.

The dla_term( ) function call is used to terminate the use of the CATV subroutine module. The non-resident application must call dla_term( ) before exiting. The non-resident application must free any memory it has allocated before exiting.

The dla_channelChange( ) function call requests the resident CATV software to change channels, and display audio/video (depending on the value of av_flag). The resident CATV software attempts to service this request by changing channels, displaying audio/video depending on the value of av_flag, and returning channel overlays to the non-resident application, in the manner described above for normal broadcast television program reception. The resident CATV software then signals the non-resident application using the user specified signal number sig to let it know that it has completed servicing the request. The non-resident application must call dla_getChannelStatus( ) following the reception of a signal with signal number sig. Also, the resident CATV software initiates the termination of an existing IAText session when it gets a channel change request by sending an EXIT key to the HDT. Hence, the non-resident application must reestablish the IAText session using dla_initIATextSession( ) if it wishes to exchange data with a text information provider (TIP) or server 18.

The dla_getChannelStatus( ) function call is used to check if the channel change was successful. It must only be called by the non-resident application after it has received a signal that matches the sig parameter in the last dla_channelChange( ) call. If called before receiving the sig signal an E_NOTRDY error code is returned. The E_NOTRDY error code returned by the resident application implies that the dla_channelChange( ) call has not yet been completed. A SUCCESS code from the resident application implies the dla_channelChange( ) call has been successfully completed. All other OS-9/DAVID errors indicate the reason for which the dla_channelChange( ) call has failed. The non-resident application must manage the memory pointed to by channel, pmtPid, and overlay. The maximum length of overlay is 256 bytes.

The dla_initIATextSession( ) function call requests the resident CATV software to set up an IAText session with the Text Information Provider (TIP). The resident CATV software attempts to set up an interactive text session with the VIP's text server 18 by sending a VIP key to the HDT 230. The resident CATV software then signals the non-resident application using the user specified signal number sig to let it know that it has completed servicing the request. The broadcast application download routine must call dla_getIATextStatus( ) following the reception of the signal to determine if the request has succeeded or failed. If the request is completed successfully, the non-resident application can use stdin and stdout file descriptors to receive and send data on the IAText link. It does so using OS-9_os_read( ) and _os_write( ) system calls. Since the non-resident application is spawned as a child process of the resident CATV application, the resident CATV application can manipulate the non-resident application's standard paths to those opened for IAText.

The VIP defines its own messaging protocol between the text information server program and the non-resident application. Each message must have a message header that gives the length of the entire message. Due to the current HDT IAText implementation, an _os_read( ) request will return a 22 byte block of characters (except possibly for the last block). Hence, it is the non-resident application's responsibility to keep on reading until it has received all the bytes in the message. The DET 102 will correctly handle _os_write( ) requests of greater than 22 bytes transparently to the non-resident application (it will package messages into 22 byte blocks and send them to the HDT 230). The HDT 230 then sends 22 byte (except possibly for the last block) blocks as separate X.25 messages to the text information program in the server 18. Hence, the text information program performs a similar reassembly, and therefore all messages must have a length field.

The dla_getIATextStatus( ) function call is used to check if the IAText session was successfully established. It must only be called by the non-resident application after it has received a signal that matches the sig parameter in the last dla_initIATextSession( ) call. If called before receiving the sig signal, an E_NOTRDY error code is returned. Here, the E_NOTRDY return code from the resident application implies that the dla_initIATextSession( ) call has not yet been completed. A SUCCESS return code from the resident application implies that the dla_initIATextSession( ) call has been successfully completed. All other OS-9/DAVID errors indicate the reason for which the call has failed.

The dla_termIATextSession( ) function call requests the resident CATV software to initiate the termination of the IATextSession by sending the EXIT key signaling message to the HDT 230. The resident CATV software signals the non-resident application using the user specified signal number sig to let it know that it has completed servicing the request. The non-resident application must call dla_getTermIATextStatus( ) following the reception of a signal with number sig to verify that the request has been successfully terminated.

The dla_getTermIATextStatus( ) function call is used to check if the IAText session was successfully terminated. It must only be called by the non-resident application after it has received a signal that matches the sig parameter in the 1st dla_termIATextSession( ) call. If called before receiving the sig signal an E_NOTRDY error code is returned. The resident application may return an E_NOTRDY message implying that the dla_termIATextSession( ) call has not yet been completed. Return of a SUCCESS message implies the function call has been successfully completed.

The dla_squelch( ) function call requests the resident CATV software to squelch audio, video or both depending on the value of av_flag. The resident CATV software signals the non-resident application using the user specified signal number sig to let it know that it has completed servicing the request. The non-resident application must call dla_getSquelchStatus( ) to check if the request was completed successfully after it has received a signal whose number equals sig.

The dla_getSquelchStatus( ) function is used to check if the audio and/or video was successfully squelched. It must only be called by the non-resident application after it has received a signal that matches the sig parameter in the last dla_squelch( ) call. If called before receiving the sig signal an E_NOTRDY error code is returned.

The catvSignalHandler( ) function call must be called whenever the non-resident application receives a signal whose number is in the range [sig_base, sig_base+15] which has been allocated to the resident CATV software. This mechanism improves the efficiency of the CATV subroutine module.

The application program interface also provides a SIG_TERMINATE message. The resident (CATV) application sends this message to the non-resident application to tell the non-resident application to release all resources and then exit. From the time a SIG-TERMINATE signal is received, the non-resident application has 1 second to clean up and exit; this must include a call to dla_term( ).

Also, a SIG_SUSPEND message may be sent from the resident CATV application to the non-resident application to tell the non-resident application to store any screen state and then go to sleep until a SIG-RESUME signal is received. This function is needed to implement an emergency broadcasting service (EBS), as well as HOLD button and One Button Interactive features. The non-resident application has 1 second to suspend itself after receiving a SIG SUSPEND signal.

A SIG_RESUME message may be sent from the resident CATV application to the non-resident application to tell the non-resident application to redraw the screen and continue running. The screen is to be redrawn based on information stored when the SIG_SUSPEND message was received. Only an active application is allowed to draw on the screen. When the non-resident application gets a SIG_RESUME signal, it must call dla_getChannelStatus( ) and dla_getIATextStatus( ).

The downloaded applications software conforming to the above discussed software interface controls a wide variety of DET functions in accord with each VIP's services. For example, this software may specify the functionality of the user interface (UI), types of transactions to be performed, graphics styles, etc. Once all necessary software resides in memory in the DET 102, and the DET begins execution of the downloaded software, the user begins interaction with the services offered by the particular service provider or VIP.

The downloaded software from one service provider or VIP might present menus and prompts in simple text form. Another provider, however, might choose to present menus and prompts in a much more graphical form approaching virtual reality. One user interface for interactive services might emulate a shopping mall. The precise presentation to the user displayed on the television set is determined by the application software downloaded by the service provider and stored in the DET's system memory 120.

As noted, the text server 18 can instruct the set-top terminal 100 to execute a broadcast download of application software at any point in an interactive session. Typically, the server 18 will so instruct the set-top terminal after subscriber validation and/or after a user initially, selects an interactive service. The text server may instruct the terminal 100 to execute one or more additional download operations to obtain more or replacement software, as the user proceeds through the selected interactive service. Also, the user may terminate one interactive service, initiate a new selection process and pick a new interactive service, while continuing the one communication session with the text server 18. In such a case, the server 18 will instruct the set-top terminal 100 to download the software for the newly selected service and write the newly downloaded software over any part or all of the software previously stored in the RAM 122.

Because of the capacity to carry broadcast digital video signals, the use of the DET 102 in the network of FIGS. 8A and 8B offers an extremely wide range of broadcast services. As noted above, full motion interactive services, such as video-on-demand, could be available through the network. However, full motion interactive video requires point-to-point video communication resources which are expensive to implement and may not be available. The exemplary network, for example, does not provide such broadband point-to-point communications. The present invention therefore provides broadband interactive services to a larger number of subscribers by manipulating the DET to capture application software, as discussed above, and to capture and display individual frames or preferably short sequences of frames of video together with accompanying audio (if desired). Each such video frame uses only a very small portion of the transport capacity in one transport stream in one of the network's broadcast channels. Interactive services utilizing limited amounts of video information allow many subscribers to access information transported in the one digital broadcast channel.

In a network offering interactive services using less than full motion real time broadband capacity, in accord with the present invention, the still frame, full motion video segments and graphic image services are all provided by the interaction of three distinct systems, the transport system, the DET hardware and operating system, and application software code downloaded and stored in the DET memory. The application software code will manage the viewer interface and present to the viewer the content contained in the MPEG II elementary streams and in the messages carried over the two-way data link, etc.

As shown by the above discussion, for an interactive service, the receiving operation of the terminal 100 is generally similar to that for receiving the broadcast services discussed above except that the terminal receives and processes application software, data and a limited number of frames of audio and video information, instead of a lengthy full motion audio/video sequence. In a full motion video type service, such as the broadcast services, the audio/video processor 125 typically will process thirty frames per second of video in addition to accompanying audio information. For the interactive services, the audio/video processor 125 may process a short sequence of full motion information, e.g. several seconds up to thirty seconds, but normally that processor receives and processes frames at lower rates. Also, in many applications, the video will not fill the full display on the TV 103, further reducing the bandwidth and processing requirements.

The downloaded application code controls operation of the terminal 100 for the duration of the interactive session or until the code is written over by newly downloaded code. The interactive session may continue under control of the non-resident application, even after termination of the two-way low-speed data communication with the text server. Many simple applications such as a program guide service or a simple video game (e.g. checkers) do not require further communication with the text server 18 and the application download operation is complete. The execution of this non-resident application will control responses to subsequent user inputs (except for reserved keys) and processing of received information for presentation to the user. For example, the executable code may use data downloaded with the application which would specify PID values and time stamps for audio and video to be decoded and presented in response to predetermined user inputs. As discussed in detail above, the control of the set-top terminal by the non-resident application involves providing standardized 'calls' to the resident application, particularly for communication of signaling messages to elements of the communication network such as the HDT 230. The non-resident application will also receive certain standardized messages from the resident application, reporting status of requested actions and relaying information received from the elements of the communication network such as the HDT 230.

Figure 9:
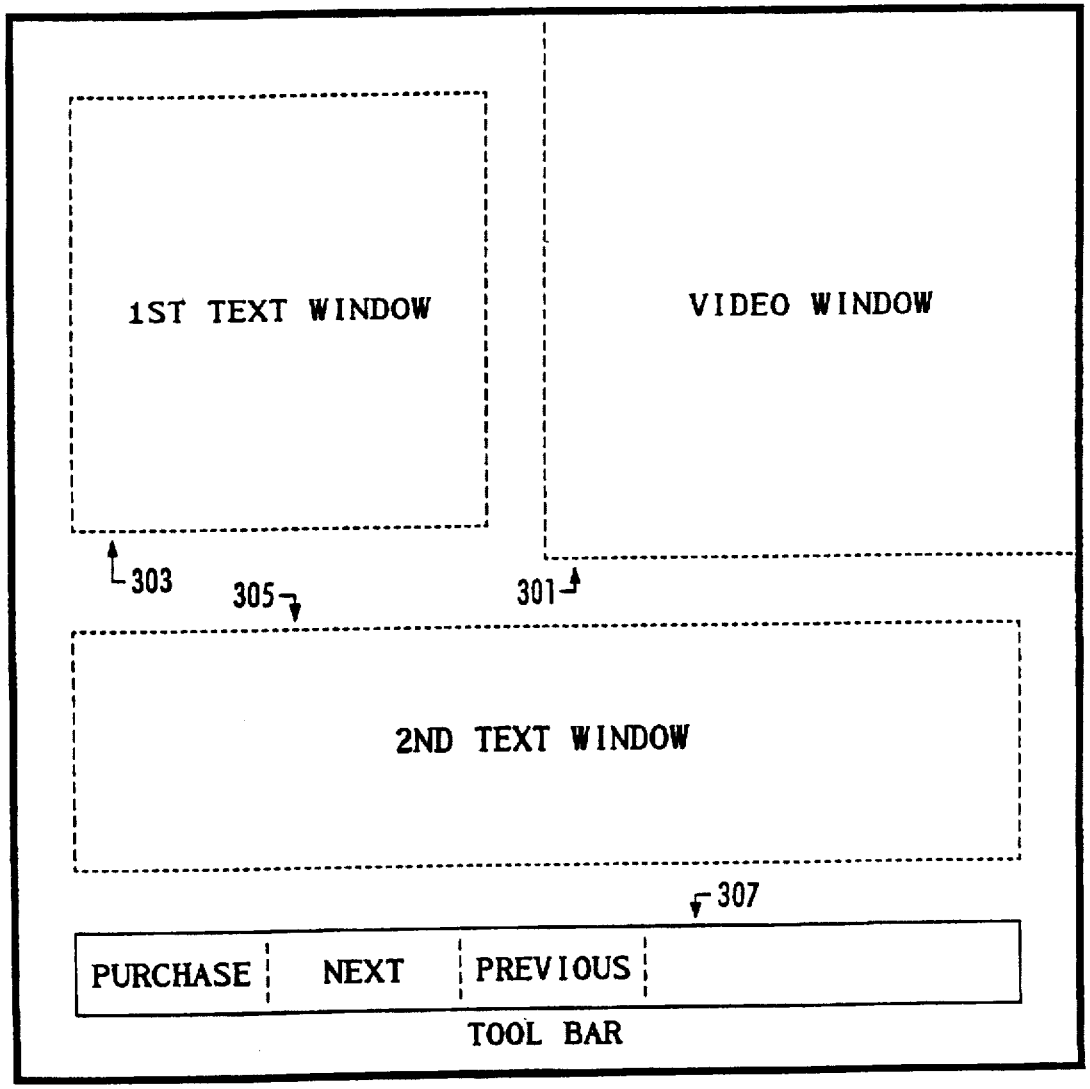
FIG. 9 illustrates an exemplary display screen for an interactive service, such as a catalog application, implemented with the software processing of the present invention.

In many interactive services, the non-resident application will control the processing by the digital audio/video processor 125 to provide an overlay or windowed display of video and graphics for viewing by the user. FIG. 9 depicts a simple example of a display for a catalog type interactive application, implemented in accord with the present invention. In this example, the display will provide a quarter screen video window 301. The screen may provide one or more text windows 303, 305. In the illustrated example, the first text window 303 might display descriptive text received via the broadcast channel, and the second text window 305 might display prompts and/or responses to user inputs received via the two-way narrowband communication with the text server 18. The screen also displays a tool bar 307. The tool bar displays selection options such as PURCHASE, NEXT (page) and PREVIOUS (page) for specialized user inputs. The user selects an input from the tool bar via a cursor control provided via the remote control of the terminal 100.

The video frames transmitted through the broadcast channel, for use in the video window 301, are sized for quarter screen display and therefore require less data to transmit. Although encoded using the MPEG II encoding algorithm, the data rate for video intended for window 301 is further reduced by encoding of this video off-line for storage and spooling transmission (as opposed to real-time encoding by the encoders 25). For any given interactive application, the broadcast channel will carry a number of short segments of video information. The segments may range from a single frame up to some number of seconds of full motion video.

In accord with the present invention, the interactive application software stored in the RAM 122 controls the DET 102 to cause selection of segments of video frames. In this regard, data associated with the application or data obtained via the two-way communication link with the server 18 specifies a PID value for a video segment and start and stop times. The time values may be specified in SMPTE time codes or one of the time codes present in the MPEG encoding (e.g. PCR values).

For example, if the user selects to view information relating to a pair of shorts in the catalog, the interactive application software running in the microprocessor 110 would obtain a PID value and start and stop times for a video segment relating to the selected pair of shorts. The microprocessor 110 would supply the PID value to the MPEG system demultiplexer 127, and in response that demultiplexer would supply payload data from the packets identified by that PID MPEG video decoder 129. The microprocessor 110 would also control the demultiplexer 127 and/or the decoder 129 to initiate decoding of the payload data upon detection of the start time and to terminate the decoding of the payload data upon detection of the stop time. In this manner, the decoder processes MPEG data for one or more frames identified by the PID value and between the specified time values. The microprocessor 110 could similarly control the demultiplexer 127 and the audio decoder 131 to provide any audio accompaniment.

If the video frames received between the start and stop times represent full motion video, the decoder 129 processes those frames in the normal manner for full screen or windowed display. If the frames represent a partial screen display, for example, the graphics overlay controller loads the decoded digital information into the appropriate locations in the video RAM 135, to produce a display thereof in the video window 301. In the catalog example, the video in the window might show a model wearing the shorts engaged in some athletic activity.

In operation, the video decoder 129 processes a frame and supplies the decompressed frame information to the video RAM 135 in the normal manner. The frame remains in the RAM 135 until it is replaced. In a full motion sequence, the frame is replaced immediately after one readout thereof. However, for a limited motion sequence or still frame display, the frame remains in the RAM 135 for longer than one read cycle. The last decoded frame in the RAM 135 therefore is repeatedly cyclically output from the RAM 135 to the NTSC encoder 137 until replaced by a subsequent video frame from the video decoder 129. The repeated output of the one frame produces a still or freeze frame type image on the associated television 75.

In a similar manner, the decoder 129 decodes small size frames for full-motion or freeze-frame display in the video window and supplies those frames through the controller 133 to the video RAM 135. The downloaded application specifies a location of the video window 301 on the display screen, and the microprocessor 110 instructs the controller 133 to place the decoded frame information in the area of RAM corresponding to the window location. In that location, the video RAM 135 stores each frame until replaced. For a full motion sequence, the frame data for the window is replaced immediately after one readout thereof. As a result, the video window 301 contains the full motion video. However, for a limited motion sequence or still frame display, the video frame data remains in the window location in the RAM 135 for longer than one read cycle. The last decoded frame for the video window stored in the location in the RAM 135 therefore is repeatedly cyclically output from the RAM 135 to the NTSC encoder 137 until replaced by a subsequent video frame from the video decoder 129. For example, the repeated output of the display data containing one frame within the video window produces a still or freeze frame type image in the window 301.

Still frame images, such as pictures of products in a catalog, can be encoded and transmitted using a single MPEG-II I-frame. However, even an I-frame will typically exhibit some loss of resolution. In accord with another aspect of the present invention, still frames are preferably encoded in a short sequence of frames. The interactive application obtains a PID value and start and stop time values for the sequence of frames. The sequence may be as short as one I-frame and two P-frames. The sequence may further include one more B-frames. Alternatively, the sequence may comprise the frames making up one MPEG II 'group of pictures' (e.g. 15 frames). However, all of the frames relate to a single freeze-frame image. The video decoder 129 will process the sequence of frames representing the still frame as normal video information. Through this sequential processing, the decoder will build up a relatively high resolution still frame image by the time it processes the last frame in the sequence. When the decoder 129 stops further processing, the last frame remains in the output frame buffer of the video decoder 129. As a result, the decoder will continually, repeatedly output the high resolution still frame at the full video rate until that frame is replaced with newly decoded information. This still frame technique may be used for full screen display of the images or for windowed display of the type discussed above with regard to the window 301 in FIG. 9.

The downloaded or non-resident application will specify the location and size of each of the windows and the graphics plane of the information within the window. The non-resident application also controls the content of each window and/or how the content is manipulated in response to user inputs. For example, in the catalog application, the non-resident application software would include information (data) relating to products in the catalog and related presentation materials carried on the data carousel. If the user picks shorts of a particular style, the non-resident application would retrieve data from the downloaded tables and initiate presentation of an audio and video segment, identified by PID values and time stamps. The resulting television type display in the video window 301 might show the active model wearing the shorts, as discussed above. If the user then picks a specific color, the non-resident application might initiate capture of a short sequence of frames representing a still frame image of the model wearing the shorts in the selected color.

As noted above, the text server 18 has a communication link to the software server 12. During an interactive text session between the text server 18 and the set-top terminal 100, the user activation through the non-resident application may result in a request for some information not carried on the data carousel. In the catalog, variations in style and color may be too numerous to permit transmission of all video presentation materials continuously. In response to a request requiring material not presently in the data carousel, sent from the non-resident application to the text server, the text server 18 will instruct the software server 12 to add the relevant materials (code, data, video or audio) to the data carousel for some predetermined time or numbers of carousel repetitions. The software server 12 modifies the file for the data carousel to include the specified material and transmits the modified carousel over the broadcast channel.

In an alternative implementation, fixed carousel material might be supplied from one software server through a first data module and the selected items supplied from the same or a second server through a second data module. In this case, the ATM multiplexer 29 would adapt and multiplex the inputs from the two data modules into one channel stream for transmission through one of the ATM virtual circuits.

After modification of the data carousel to include the new materials, the text server 18 instructs the set-top terminal to capture the information (video, audio, data or executable code), in the manner described in detail above. For example, if the requested information is a still frame of short video display, the text server 18 would provide a message to the set-top terminal identifying the broadcast channel, the PID value(s) and the start and stop times for the video information and accompanying audio information if any.

After the specified time period, say several minutes, the software server again modifies the file for the data carousel to remove the material or replace the material with new material, destined for the same or a different user. In this manner, the system can provide interactively requested materials (code, data, audio or video) to individual terminals 100. The combination of fixed cyclical broadcast materials together with specific materials individually requested by users permits a high degree of interactivity. Also, the use of various combinations of text and video segments provides an effective multimedia presentation. However, the highly interactive service still only uses low-speed data communication with the text server and broadcast transmission through as few as one broadcast channel.

Also, the combination of reduced size and limited length video segments together with the packet stream multiplexing permits transport of interactive service materials for a number of different interactive services on one broadband digital broadcast channel. For example, using a quarter screen image and off-line encoding techniques, full motion video for the above catalog example would use no more than 1.5 Mbits/s capacity and preferably a lower capacity. During periods when the carousel transmission (at 6 Mbits/s) carries the packets for the quarter frame video for the catalog service, the carousel may carry three or more other video streams for use in the same or a similar interactive service. The alternate videos are distinguished by the differing PID number identifications.

In addition, the data carousel will carry a number of different video sequences sequentially, multiplexed together with the code, data and audio for the interactive service(s). For example, after the full motion video segment showing the model wearing the shorts and engaged in some athletic activity, the packets for the video of the catalog application might carry several still frames, followed by a full motion video segment of some other article of clothing, followed by code and data, etc.

Also, within a relatively long carousel file, items requiring quick access and retrieval will be repeated. For example, the executable application code may comprise a relatively small sub-file or module (say 1.5 Mbits), and it may be desirable to permit rapid access to the code to permit requesting subscriber's to quickly initiate the service. The code therefore might repeat several times in one cycle of the carousel and therefore appear repeatedly in the data stream at the terminal relatively often, e.g. once every second or two. In contrast, certain still frame images of infrequently requested products may repeat only once in each full cycle of the carousel and therefore appear at the terminal only infrequently (e.g. once every 30 seconds or so).

Frequently requested video segments (full motion or still frame) may always appear in the data carousel, i.e. they may be a static part of the data carousel file for the particular interactive service. Other video segments are inserted in the carousel for some limited time period after a message from the text server indicating a need to transmit the material to a particular terminal, e.g. in response to a particular selection input by the user of that terminal, as discussed above.

The audio for the interactive services may be handled in a manner similar to the video, by specifying a PID number. For full motion video segments, the transport stream would likely include accompanying real time audio. There may or may not be accompanying audio for still frame presentations. In those cases, the non-resident application may specify a PID value for a background audio track, for example a jingle used by the catalog company for their advertising and the like. It is also possible to download audio in an OS-9 file through the broadcast channel, store it as user data in the RAM, and play it from memory.

In the above examples, we mainly assumed that the interactive services together utilized one broadcast channel with only limited associated video. Alternatively, one interactive download service may run on a channel carrying a normal video program. In such a case, the ATM mux 29 would combine a reduced rate video stream from an encoder or other source (say at 4.5 Mbits/s) together with the data carousel output of the data module 27 (say at 1.5 Mbits/s) into one 6 Mbits/s channel stream for broadcast through the network. The set-top terminal 100 would produce normal video and audio presentations of the program through the television 103. When activated, the system would download the application software from the channel to the DET 102. The downloaded or non-resident application would control subsequent responses to user inputs and text/graphic overlays on the video, in essentially the manner discussed above. However, these overlays would be presented on top of the broadcast program video. One example of this type of approach might involve a television game show presented on the normal video and audio portion. The interactive application download would allow the user to play along with the game, and at least at the end of the game, to report scoring information to the text server for further processing.

While this invention has been described in connection with what is presently considered to be the preferred embodiments, it is to be understood that the invention is not limited to the disclosed embodiments, but, on the contrary, is intended to cover various modifications and equivalent arrangements included within the spirit and scope of the appended claims.

We claim:

1. A system comprising:

a communication network providing a plurality of broadband digital broadcast channels and narrowband two-way data communications;

a source of digital video programming coupled to transmit the digital video programming through a first one of the broadcast channels of the communication network;

a software server coupled to cyclically transmit software through a second one of the broadcast channels of the communication network, the software comprising at least executable code;

a text server coupled to the network for narrowband two-way data communications; and a plurality of digital terminals coupled to the network to selectively receive the broadcast channels and coupled to the communication network for narrowband two-way data communications, each digital terminal comprising:

(a) a digital audio/video processor selectively processing digital information received via the broadcast channels to produce signals to drive an audio/video output device, (b) a protected memory storing an operating system and a resident application, (c) a random access memory for receiving and storing the executable code as a non-resident application, and (d) a programmable processor executing the operating system and the resident application and selectively executing the non-resident application, the programmable processor controlling the operations of the terminal including the operations of the digital audio/video processor in accord with the operating system and executed applications, wherein said programmable processor controls the digital terminal to receive the executable code and load the executable code in the random access memory in response to a message received from the text server via narrowband data communication.

2. A system as recited in claim 1, wherein said protected memory comprises a non-volatile random access memory.

3. A system as recited in claim 2, wherein said non-volatile random access memory comprises a flash memory.

4. A system as recited in claim 1, wherein said audio/video processor comprises:

an audio decoder for decoding compressed, digital audio information;

a video decoder for decoding compressed, digital video information; and a packet demultiplexer for analyzing packet identifiers contained in packets of a standardized format received via a broadcast channel to identify packets containing compressed, digital audio information and to route information from those packets to the audio decoder, to identify packets of the standardized format containing compressed, digital video information and to route information from those packets to the video decoder, and to identify packets of the standardized format containing software and route software from those packets to the programmable processor.

5. A system as recited in claim 4, wherein:

the audio decoder comprises an MPEG audio decoder;

the video decoder comprises an MPEG video decoder; and the packet demultiplexer is an MPEG demultiplexer.

6. A system as recited in claim 4, wherein said digital terminal further comprises a network interface module receiving an Asynchronous Transfer Mode (ATM) cell stream from the communication network, extracting packets of the standardized format from payloads of ATM cells and supplying the extracted packets to the packet demultiplexer.

7. A system as recited in claim 1, wherein:

the operating system and resident application control all communications of the digital terminal with elements of the communication network; and the resident application interfaces with the non-resident application via a set of predetermined function calls to facilitate communication with elements of the communication network during the selective execution of the non-resident application.

8. A system as recited in claim 1, wherein said at least one source of broadcast video programming comprises a program source supplying a broadband program signal, and an encoder for digitizing and compressing the broadband program signal and for packetizing the broadband program signal in digital packets of a standard format.

9. A system as recited in claim 8, further comprising a data module coupled between the software server and the communication network for packetizing the software in digital packets of the standard format.

10. A system as recited in claims 8, wherein the software server stores the software in digital packets of the standard format and cyclically outputs the software in digital packets of the standard format.

11. A system as recited in claim 8, wherein said encoder comprises a real time encoder for digitizing and compressing an audio/video program signal.

12. A system as recited in claim 11, wherein said real time encoder comprises an MPEG encoder.

13. A system as recited in claim 1, wherein said communication network comprises:

a system of optical fibers for broadcasting the first and second broadcast channels; and a plurality of host digital terminals each coupled between the system of optical fibers and a group of the digital terminals for routing selected ones of the channels to set-top terminals in each group.

14. A set-top terminal device comprising:

a network interface module adapted to couple the terminal to a communication network for two-way low-speed data communication and for receiving at least selected ones of a plurality of broadcast digital broadband channels at least one of which carries audio/video program information in compressed, digital form in packets of a standardized format and at least one of which carries cyclically repetitive transmissions of interactive service application software in packets of the standardized format, said interactive service application software comprising at least executable code; and a digital entertainment terminal comprising:

(a) an audio/video processor for processing the compressed, digital audio program information;

(b) a protected memory storing an operating system and resident application;

(c) a random access memory for receiving and storing a non-resident application;

(d) means for receiving inputs from a user;

(e) a control processor controlling operations of the set-top terminal; wherein:

said control processor captures said executable code from one of the selected broadcast digital broadband channels within a transmission cycle, loads the captured executable code into the random access memory as the non-resident application and begins operation in accord with the non-resident application loaded into the random access memory, the operating system and resident application control all communications with elements of the communication network, and the resident application interfaces with the non-resident application via a set of predetermined function calls to facilitate communication with elements of the communication network during the selective execution of the non-resident application.

15. A set-top terminal device as recited in claim 14, wherein said audio/video processor comprises:

an audio decoder for decoding compressed, digital audio information;

a video decoder for decoding compressed, digital video information; and a packet demultiplexer for analyzing packet identifiers contained in packets of a standardized format received via a broadcast digital broadband channel to identify packets containing compressed, digital audio information and to route information from those packets to the audio decoder, to identify packets of the standardized format containing compressed, digital video information and to route information from those packets to the video decoder, and to identify packets of the standardized format containing software and route software from those packets to the programmable processor.

16. A set-top terminal device as recited in claim 15, wherein:

the audio decoder comprises an MPEG audio decoder;

the video decoder comprises an MPEG video decoder; and the packet demultiplexer is an MPEG demultiplexer.

17. A set-top terminal device as recited in claim 15, wherein said network interface module receives an Asynchronous Transfer Mode (ATM) cell stream, extracts packets of the standardized format from payloads of ATM cells and supplies the extracted packets to the packet demultiplexer.

18. A set-top terminal device as recited in claim 14, wherein the predetermined function calls include a channel change function call.

19. A set-top terminal device as recited in claim 14, wherein the predetermined function calls include a function call for establishment of a two-way low-speed data communication.

20. A set-top terminal device as recited in claim 14, wherein the predetermined function calls include a function call for low-speed data communication of a user input.

21. A storage medium, readable by computer, said medium storing application software for controlling a digital set-top terminal, wherein said application software comprises:

executable code for controlling operations of a digital set-top terminal in response to user inputs; and a plurality of function calls for calling predetermined network communications functions of software resident in the digital set-top terminal, wherein the plurality of functions calls comprise:

(a) a channel change function call, and (b) a function call for establishment of a two-way low-speed data communication;

wherein the storage medium is an element of a server.

22. In a network broadcasting audio/video program information through a plurality of broadband channels to a plurality of terminals connected to the network and selectively providing low-speed two-way data communications between individual ones of the terminals and a server, a method comprising the steps of:

cyclically broadcasting at least one interactive service application on one of the broadband channels, said at least one interactive service application comprising executable code;

selectively receiving the one broadband channel at one of the terminals;

in response to a message transmitted from the server to the one terminal, receiving the executable code and loading the executable code into memory in the one terminal; and executing the loaded code from memory to control interactive operations of the one terminal.

23. A method as recited in claim 22, wherein:

the step of cyclically broadcasting comprises cyclically broadcasting a plurality of interactive service applications together with predetermined data identifying each of the interactive service applications on the one broadband channel, each of said interactive service applications comprising executable code;

the message transmitted from the server to the one terminal includes predetermined identification data identifying one application which relates to a selected interactive service; and the step of receiving the executable code comprises capturing executable data from the one broadcast channel corresponding to the predetermined identification data identifying one application.

24. A method as recited in claim 22, wherein the at least one interactive service application further comprises data, digital video information and digital audio information.

25. A method as recited in claim 24, wherein the digital video information corresponds to a plurality of still frame images.

26. A method as recited in claim 24, wherein the digital video information corresponds to a plurality of separate full-motion video segments.

27. A method as recited in claim 24, wherein the executing step controls presentation of a selected portion of the digital video information.

28. A method as recited in claim 24, wherein the executing step controls presentation of a selected portion of the digital audio information.

29. A method as recited in claim 22, wherein the at least one interactive service application further comprises at least one of the following types of information: digital video information, digital audio information and data information, said method further comprising:

communicating user input data upstream via low-speed data communication;

in response to the user input data, modifying the information in the at least one interactive application;

cyclically broadcasting the modified at least one interactive application; and executing the loaded code to control capture and processing of at least a portion of the modified information by the one terminal.

30. A method of providing an interactive communication service comprising:

forming a transport stream for an interactive service application, said transport stream comprising first packets containing executable code and second packets containing digital, compressed data for a plurality of sequences of video frames;

wherein each of the first packets includes a first predetermined packet identifier, each of the second packets includes a second predetermined packet identifier, and a plurality of the second packets include time stamp values;

cyclically broadcasting the transport stream on a digital broadband channel;

storing the executable code in memory in a digital set-top terminal; and executing the stored code to control operations of the digital set-top terminal including presentation of a predetermined one of the sequences of video frames, wherein the control of presentation comprises capturing packets having the second predetermined packet identifier and within a predetermined range of time stamp values.

31. A method as recited in claim 30, wherein the predetermined sequence of video frames relates to a single still image.

32. A method as recited in claim 30, wherein the predetermined sequence of video frames relates to a full-motion video segment of a predetermined length.

* * * * *